US007730089B2

(12) United States Patent
Campbell et al.

(10) Patent No.: US 7,730,089 B2
(45) Date of Patent: Jun. 1, 2010

(54) METHOD AND SYSTEM FOR PROVIDING REMOTE ACCESS TO THE FACILITIES OF A SERVER COMPUTER

(75) Inventors: R. David L. Campbell, Seattle, WA (US); Paul E. Onnen, Sammamish, WA (US); Edward M. Sarausad, Sammamish, WA (US); Steven W. Plate, Bellevue, WA (US)

(73) Assignee: Punch Networks Corporation, Seattle, WA (US)

( * ) Notice: Subject to any disclaimer, the term of this patent is extended or adjusted under 35 U.S.C. 154(b) by 1843 days.

(21) Appl. No.: 09/927,899

(22) Filed: Aug. 10, 2001

(65) Prior Publication Data

US 2002/0111942 A1 Aug. 15, 2002

Related U.S. Application Data

(63) Continuation-in-part of application No. 09/441,614, filed on Nov. 16, 1999, now abandoned.

(60) Provisional application No. 60/108,661, filed on Nov. 16, 1998.

(51) Int. Cl.
*G06F 17/30* (2006.01)
(52) U.S. Cl. ................................................ 707/781
(58) Field of Classification Search ............... 707/1, 707/2, 8, 9, 10, 513, 781; 709/206, 221; 713/165, 166; 370/401
See application file for complete search history.

(56) References Cited

U.S. PATENT DOCUMENTS

| 5,787,175 | A | * | 7/1998 | Carter | 713/165 |
|---|---|---|---|---|---|
| 5,941,947 | A | * | 8/1999 | Brown et al. | 709/225 |
| 5,946,686 | A | * | 8/1999 | Schmuck et al. | 707/10 |
| 5,968,176 | A | * | 10/1999 | Nessett et al. | 713/201 |
| 6,339,826 | B2 | * | 1/2002 | Hayes et al. | 713/166 |
| 6,470,453 | B1 | * | 10/2002 | Vilhuber | 713/201 |
| 6,539,021 | B1 | * | 3/2003 | Kennelly et al. | 370/401 |
| 2002/0129058 | A1 | * | 9/2002 | Story et al. | 707/513 |

* cited by examiner

*Primary Examiner*—Etienne P LeRoux
(74) *Attorney, Agent, or Firm*—Christensen O'Connor Johnson Kindness PLLC

(57) ABSTRACT

A method and system for providing remote access to the facilities of a server computer are provided. A site integration application programming interface at a co-branded Web site. The site integration application programming interface exposes a number of servlets that may be executed in response to requests received from a business partner Web site over a secure communications link. The servlets provide functionality for accessing the user registration and deletion facilities of the co-branded Web site. Moreover, the servlets also provide access to other administrative facilities provided at the co-branded Web site. The servlets also provide functionality for authorizing a user to access the co-branded we site. This servlet may be executed in conjunction with the login facilities of the business partner web site to permit concurrent login at both sites.

20 Claims, 31 Drawing Sheets

ROUTINE 1000 FOR UPDATING A
NETWORK DATABASE
(CONTINUED)

METHOD AND SYSTEM FOR PROVIDING REMOTE ACCESS TO THE FACILITIES OF A SERVER COMPUTER

REFERENCE TO RELATED APPLICATIONS

This invention is a continuation-in-part of U.S. patent application Ser. No. 09/441,614, filed Nov. 16, 1999, now abandoned which is expressly incorporated herein by reference, and which claims the benefit of U.S. Provisional Application No. 60/108,661, filed on Nov. 16, 1998, which is hereby also incorporated herein by reference.

FIELD OF THE INVENTION

This invention relates generally to the management of computer databases and, more specifically, to computer systems for providing remote access to the facilities of a server computer operative to store and update a network database.

BACKGROUND OF THE INVENTION

With the advent and explosion of the Internet, a wide variety of World Wide Web ("Web" or "WWW") sites have become available to users that provide all types of services and information. In order to provide a consistent user interface and brand name across several Web sites, a Web site may be "co-branded." Co-branding refers to the process of creating a custom version of a Web site that is visually consistent with another Web site and, in some circumstances, that appears to be provided in part by the owner of the other Web site.

For instance, a Web site may be provided that offers a service through which users can maintain and update a shared network database. A business partner of such a Web site may desire to offer such a service to their employees or customers. However, the business partner may desire to have the service provided in a manner that is visually consistent with their main Web site. To accomplish this, a "co-branded" version of the Web site for maintaining and updating a shared network database is created. The co-branded Web site contains colors, graphics, and other visual elements that are visually consistent with the colors, graphics, and other visual elements utilized at the business partner's main Web site. Moreover, the business partner's Web site is modified so that the users of the business partner's Web site may access the co-branded Web site through the business partner's Web site. Because the sites are provided in a visually consistent manner, users are more comfortable using the co-branded Web site and do not feel as if they are being transported to an external Web site.

By co-branded a Web site as described above, a great deal of value may be provided to the business partner. The business partner can offer services that appear to come from the business partner without making a large investment in creating such a service from the ground up. However, such an arrangement is not without its drawbacks. For instance, the partner Web site and the co-branded Web site are typically password protected and therefore require users to register before they may be authorized to access the Web sites. This may be frustrating for a user or system administrator who has to register twice with each site and then login to each site separately for access. Moreover, when users are deleted from the partner Web site, they should also be deleted from the co-branded Web site. If this does not occur, a former employee or customer may retain access to the co-branded Web site even after their authorization to access the partner site has been deleted.

Accordingly, in light of the above, there is a need for a method and system for providing remote access to the facilities of a server computer that synchronizes the user registration, deletion, and other maintenance facilities of a co-branded Web site with those of a partner Web site. Additionally, there is a need for a method and system for providing remote access to the facilities of a server computer that permits a user to simultaneously login to a co-branded Web site and a partner Web site.

SUMMARY OF THE INVENTION

The present invention solves the above-described problems by providing a method and system for providing remote access to the facilities of a server computer that synchronizes the user registration, deletion, and other administrative facilities of a co-branded Web site with those of a partner Web site. Moreover, the present invention solves the above-described problems by providing a method and system for providing remote access to the facilities of a server computer that permits a user to concurrently login to a co-branded Web site and a partner Web site.

Generally described, the present invention provides a site integration application programming interface ("API") at a co-branded Web site. The site integration API exposes a number of scripts, procedures and/or programs in the server ("servlets") that may be executed in response to requests received from a business partner Web site over a secure communications link. The servlets provide functionality for accessing the user registration and deletion facilities of the co-branded Web site. Moreover, the servlets also provide access to other administrative facilities provided at the co-branded Web site. The servlets also provide functionality for authorizing a user to access the co-branded Web site, also known as "logging" a user into the co-branded Web site.

More specifically described, a login user servlet is provided for receiving requests to authorize a user to access the co-branded Web site and for validating such requests. Through the use of the login user servlet, a user may be concurrently logged in to the co-branded Web site and a partner Web site. A create user servlet and a delete user servlet are provided for authorizing new users to access the co-branded Web site or deleting user authorization for accessing the co-branded Web site, respectively. A create webgroup servlet is provided for creating a new webgroup through which users may collaborate and share resources over a network communications link. Moreover, servlets are also provided for adding users to a list of users authorized to access the webgroup and for removing users from the list of users authorized to access the webgroup. Still further, servlets are provided for issuing an invitation to join the co-branded Web site to a user that has not joined the co-branded Web site. Additionally, a servlet is provided for issuing an invitation to join the co-branded Web site to a user that previously received such an invitation, but lost the previously issued invitation.

The present invention also provides a computer-controlled apparatus and a computer-readable medium for providing remote access to the facilities of a server computer.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF AN ILLUSTRATIVE EMBODIMENT

Figure 1:
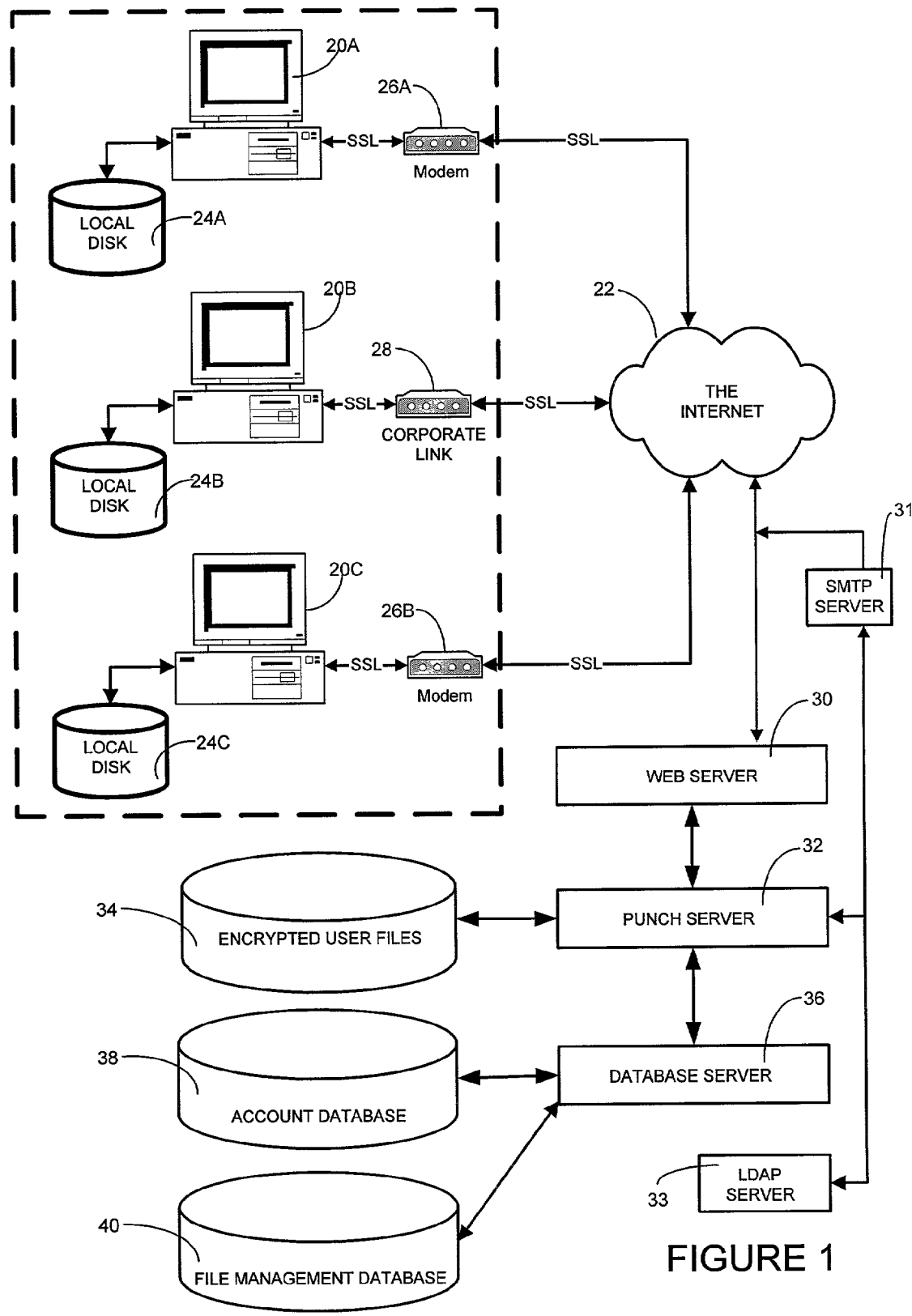
FIG. 1 is a block diagram of an illustrative operating environment for an actual embodiment of the present invention.

Referring now to FIG. 1, an illustrative operating environment for an actual embodiment of the present invention will be described. FIG. 1 illustrates a WebGroups WWW site embodying aspects of the present invention. The WebGroups WWW site is operated as an Internet service available to any client computer 20a-20n executing a WWW browser, or other Hypertext Transfer Protocol ("HTTP") enabled application, and that is connected to the Internet 22. Additionally, client computers 20a-20n may comprise any Internet enabled device, such as a cellular telephone, Internet kiosk, or other similar Internet appliance. Client computers 20a-20n accessing the WebGroups WWW site may communicate through the Internet 22 via a dial-up modem 26A through an Internet Service Provider ("ISP"), through a corporate Local Area Network ("LAN") 28, via a high-speed cable or Digital Subscriber Line modem 26B, or a narrow-band (low-speed) or broad-band (high-speed) wireless network. Client computers 20a-20n may comprise general purpose computers having local disks 24a-24n as are well known to those skilled in the art.

In an illustrative embodiment, the WebGroups WWW site comprises three components that may execute on one or more computers: WWW server 30, punch server 32, and database server 36. All three components may execute simultaneously on a single monolithic machine, or each component may be executed on one or more machines independently, either locally or remotely. Utilizing a WWW browser executing on client computer 20a-20n, a user can access the WebGroups WWW site via a Secure Hyper-Text Transfer Protocol ("HTTPS") session or via a less secure HTTP session. Alternatively, utilizing an HTTPS- or HTTP-enabled application, operating system "plug-in," or extension executing on client computer 20a-20n, a user may access the WebGroups WWW site via an HTTPS or HTTP session. In a preferred embodiment, when accessing the WebGroups WWW site, all communication between the WWW browser and the WebGroups WWW site is encrypted with the Secure Sockets Layer ("SSL") protocol as is known to those skilled in the art.

WWW server 30 receives and responds to HTTP requests. All user interactions with the WebGroups WWW site are performed through this server. HTML pages are transmitted and displayed to client computer 20a-20n to log a user into the WebGroups WWW site, and to perform functions to publish and retrieve documents as described in more detail below. WWW server 30 comprises standard WWW server software as is known to those skilled in the art, along with an additional set of software components to customize the data returned to the client computer 20a-20n. These additional software components are referred to herein as HTTP servlets.

The HTTP servlets are invoked when a user makes a request for specific information tailored to that user, for instance a file tree or member list. Application software residing on the WWW server 30 invokes the HTTP servlets. This application software can be resident within the WWW server software or it may comprise a separate application that communicates with WWW server 30. Operation of the HTTP servlets is described in more detail below with respect to FIG. 7.

The second component within the WebGroups WWW site is punch server 32. The HTTP servlets described above communicate with punch server 32. In response to this communication, punch server 32 executes additional application code, called punch servlets, which perform database queries and return results for display to the user by the HTTP servlets. For example, when a user logs into the WebGroups WWW site, the punch servlets provide a unique User ID and Password. This data is then transmitted from WWW server 30 to the HTTP servlets, which then communicate with punch server 32 to determine whether the information provided is valid.

Punch server 32 performs a database query to the third component, database server 36. Database server 36 returns the results of the query to punch server 32. Punch server 32 checks the data returned, and if the User ID and Password are valid, creates a file tree which it then returns to the appropriate HTTP servlet executing on WWW server 30. The HTTP servlet executing on WWW server 30 formats and displays the tree to the user in a dynamically-generated HTML file. Operation of the punch servlets is described in more detail below with respect to FIGS. 6 and 10A-10C.

Punch server 32 is also responsible for reading and writing user files to the file system 34. Punch server 32 encrypts all files before writing them to the file system, and decrypts all files as it reads them. Punch server 32 may encrypt all files based on a single pre-determined algorithm, a set of pre-determined algorithms, or a dynamically generated algorithm based upon the characteristics of the publisher, the file type, the transaction time and date, or some other unique method as are known to those skilled in the art. Punch server 32 is also responsible for e-mail notifications and invitations. Punch server 32 is also responsible for initiating or receiving and responding to automatic update procedures and requests. When a user is invited to a new webgroup, the invited user is sent an e-mail notification via an external Simple Mail Transport Protocol ("SMTP") e-mail server 31. Alternatively, or additionally, the invited user may be notified via some other real-time or non-real-time messaging system, or communications protocol. A user may be notified in a similar manner when a new file or version is published. A user may also be automatically transmitted new files or updates to existing files when a new file or version is published. Punch server 32 may also maintain a connection to an external Lightweight Directory Access Protocol ("LDAP") server 33, or some other public or private Internet user-location service or database. In this manner, punch server 32 may utilize the LDAP server 33 to look up potential users and groups for inclusion in a new or existing webgroup.

The third component of the WebGroups WWW site, database server 36, executes commercial database software as is well known to those skilled in the art (e.g., Oracle, Sybase, or Microsoft Corporation's SQL Server). Database server 36 responds to queries from punch server 32, performs queries to the tables in its databases 38 and 40, and returns the results to punch server 32. As is described in more detail below, account database 38 and file management database 40 contain user account information, authority information (i.e., which user has access to which file(s)), file information such as name, creator, creation date, description, etc., and user file version (i.e., which users have which version of which files).

Figure 2A:
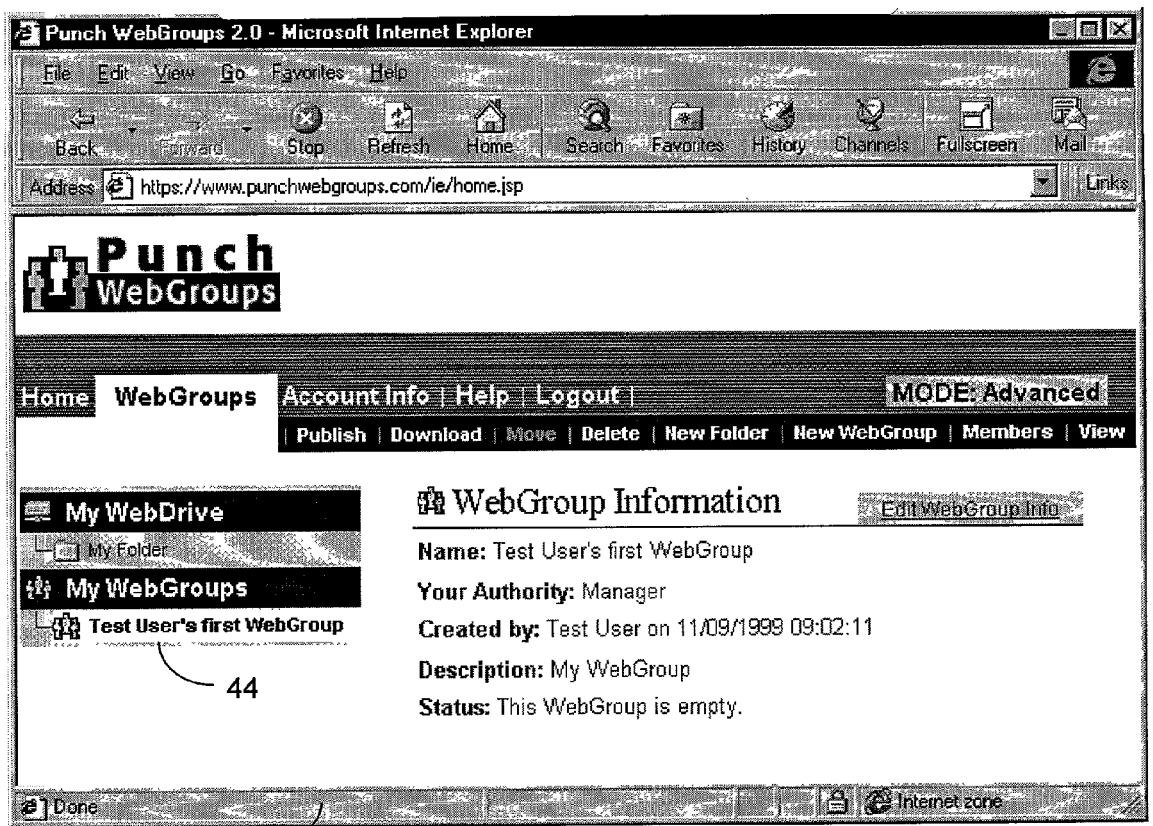
FIGS. 2A-2B illustrate windows produced by a WWW browser installed on a client computer and utilized to browse a WWW site embodying an actual embodiment of the present invention.
Figure 2B:
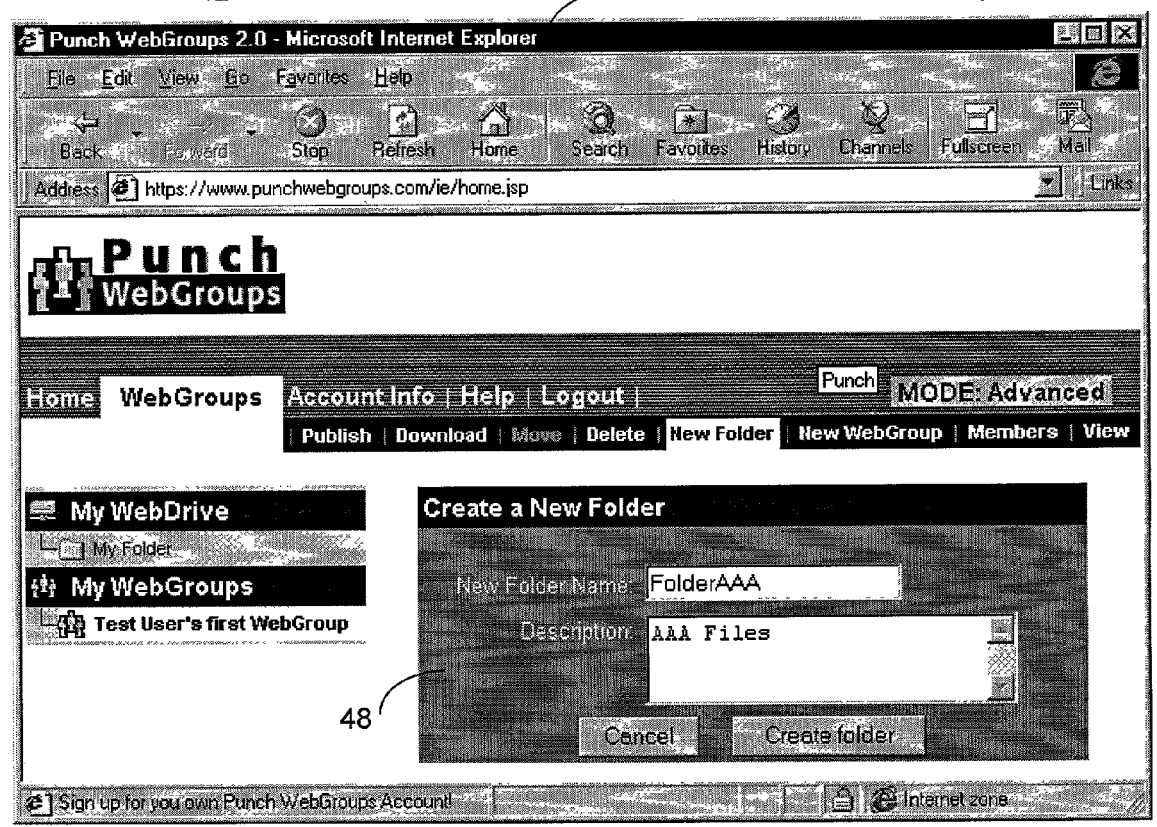

Referring now to FIGS. 2A-2B, aspects of the invention will be described in the context of the WebGroups WWW site embodying aspects of the present invention. As described above, a user may utilize a standard WWW browser 42 to visit the WebGroups WWW site. The user may then provide a name, password, and e-mail address to establish a WebGroups account. Once the user has provided this information, the user is presented with the display as seen in FIG. 2A. The display comprises a webgroup tree 44, which may include files, folders, or other webgroups. If the user selects a webgroup in the webgroup tree 44, such as "Test User's First WebGroup," the user is presented with status information regarding the webgroup. The status information may include information regarding the user's authority in the webgroup, a description of the webgroup, and information regarding the contents of the webgroup.

The user may also be presented with menu items for receiving account information, help, and for logging out of the webgroup server. The user may also be presented with an "action bar" containing menu items for performing a variety of functions within webgroup tree 44. The action bar may include menu items for publishing, downloading, and deleting files or folders from the webgroup. The action bar may also include menu items for creating a new folder or webgroup, adding members to an access control list for a file, folder, or webgroup, and for changing the view of webgroup tree 44.

When the user selects the action bar menu item for creating a new folder, the user is presented with new folder dialog box 48. In new folder dialog box 48, the user may provide a name and a description for the folder to be created. The user may then select the "create folder" user interface button to create the new folder in webgroup tree 44. For instance, if the user names the new folder "FolderAAA," a new folder named "FolderAAA" is created in the webgroup tree 44. The newly created folder 52 is reflected in the webgroup tree shown in FIG. 3B.

Figure 3A:
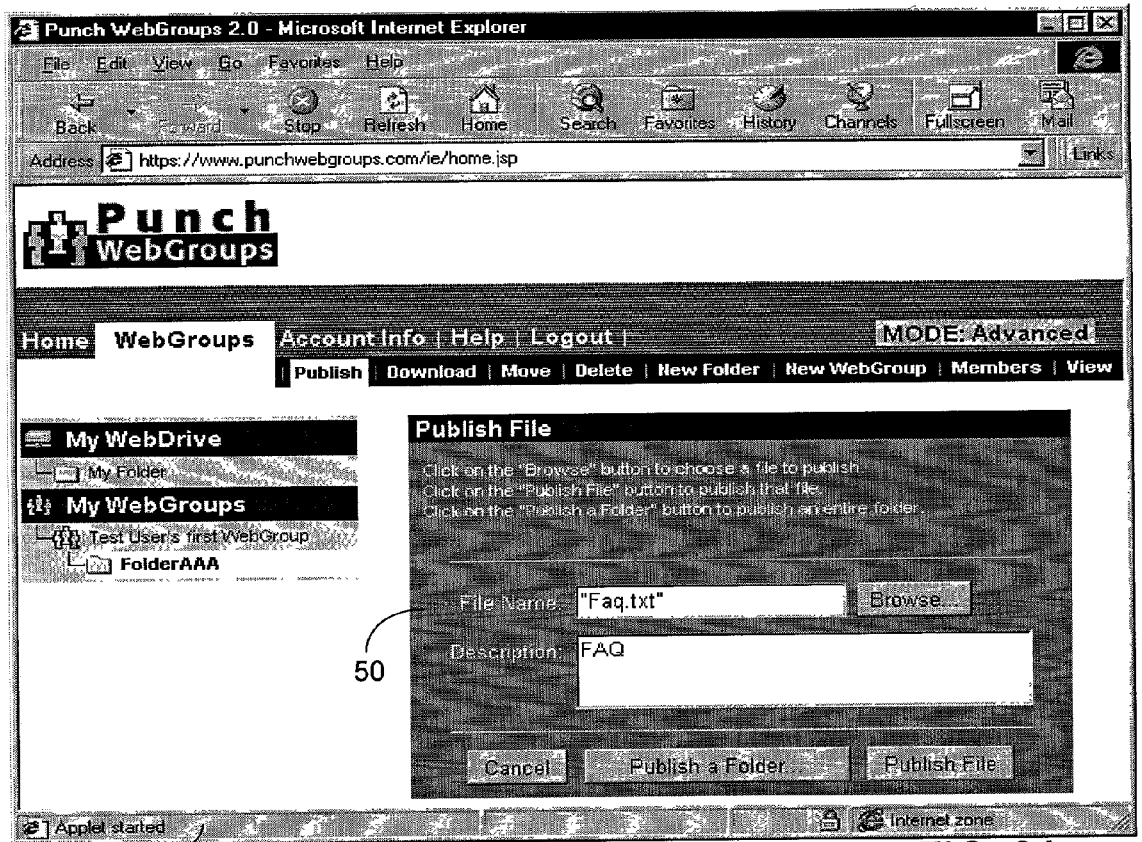
FIGS. 3A-3B depict windows produced by a WWW browser installed on a client computer and used to browse a WWW site embodying an actual embodiment of the present invention.
Figure 3B:
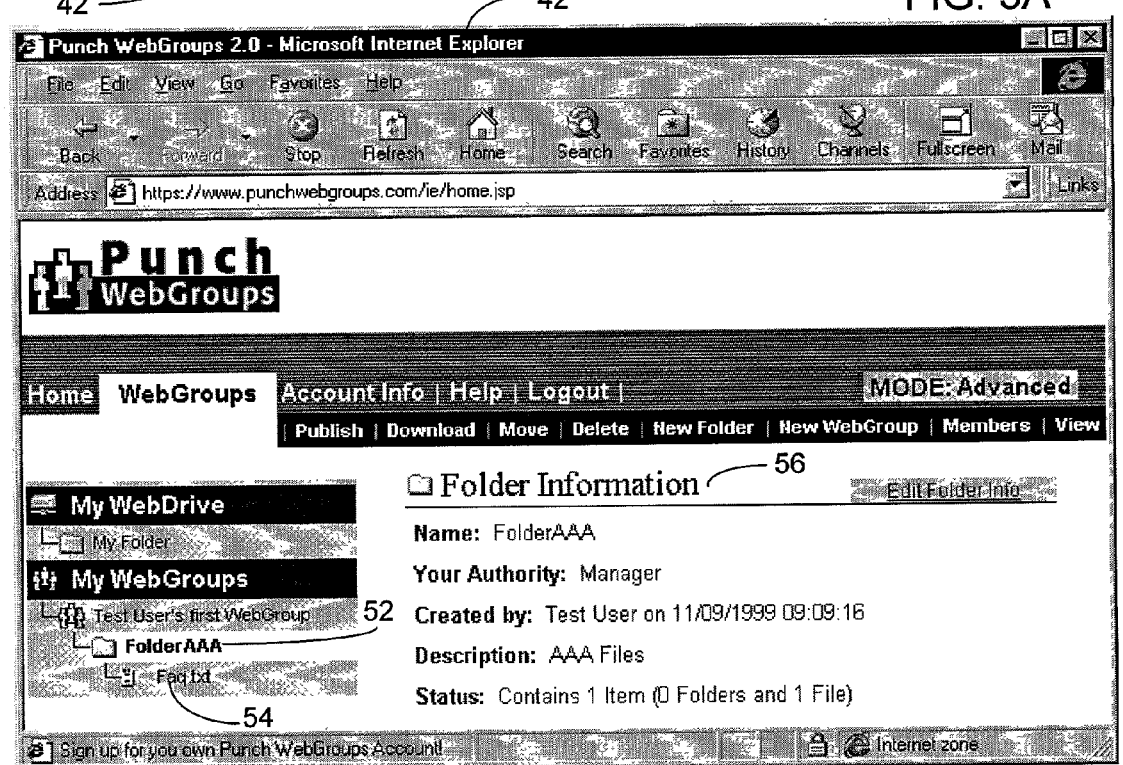

Referring now to FIGS. 3A-3B, folder information display 56 is provided if the user selects folder 52. Folder information display 56 includes information for the selected folder, including the user's authority, the date and identity of the user that created the selected folder 52, a description of the selected folder 52, and the number of files and folders within the selected folder 52. Once the user has selected folder 52, the user may select the action bar menu item for publishing another file or folder into folder 52. When the action bar menu item for publishing is selected, the publish file dialog box 50 is displayed. The publish file dialog box 50 permits the user to browse their client computer to identify a file to be published to the webgroup. The user may also select a user interface button for publishing an entire folder. The user may also enter a description of the file or folder to be published. For instance, the user may publish the file "Faq.txt" to the webgroup server and provide with it the description "FAQ."

Once the user selects the file to be published to the WebGroups WWW site, a determination is made as to whether a version of the file exists on the WebGroups WWW site. If a version of the file does exist on the site, only the differences between the file to be published and the version of the file on the site are transmitted. The transmitted information is then stored on the site and may be used later to recreate that version of the file for other users. Publishing a file from the client to the WebGroups WWW site is described in detail below with respect to FIGS. 10A-16.

Figure 4A:
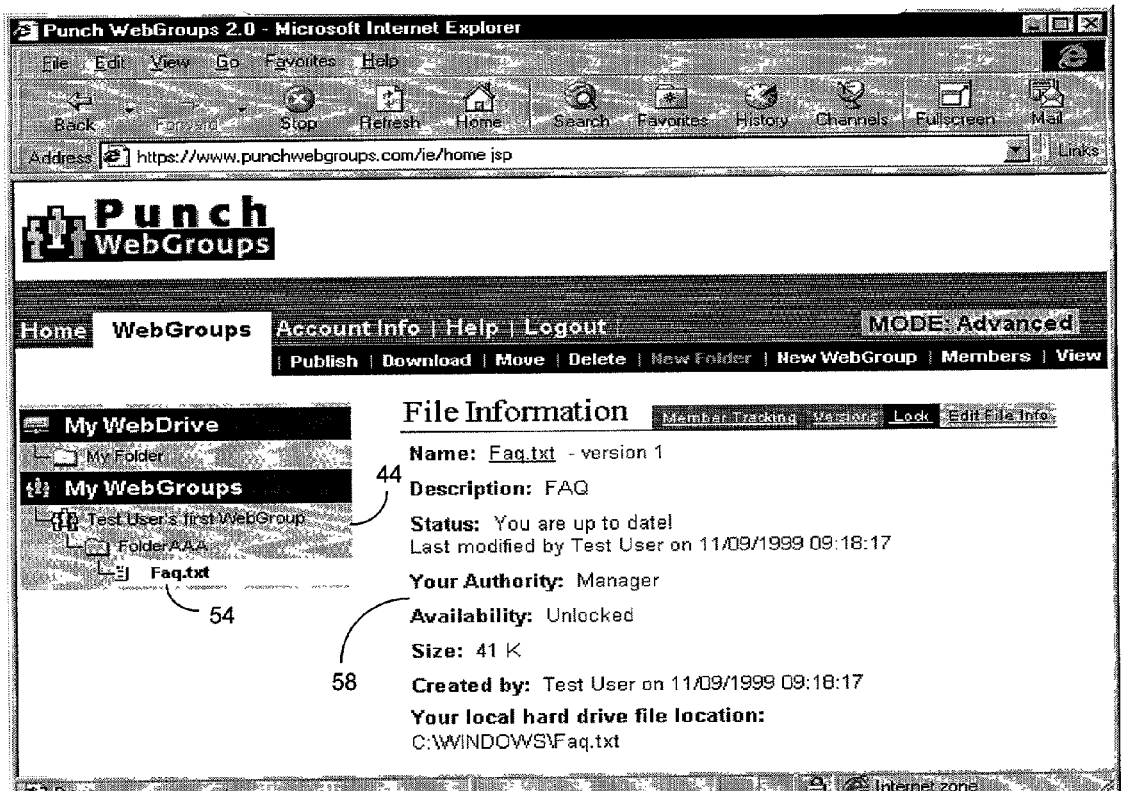
FIGS. 4A-4B illustrate windows produced by a WWW browser installed on a client computer and used to browse a WWW site embodying an actual embodiment of the present invention.
Figure 4B:
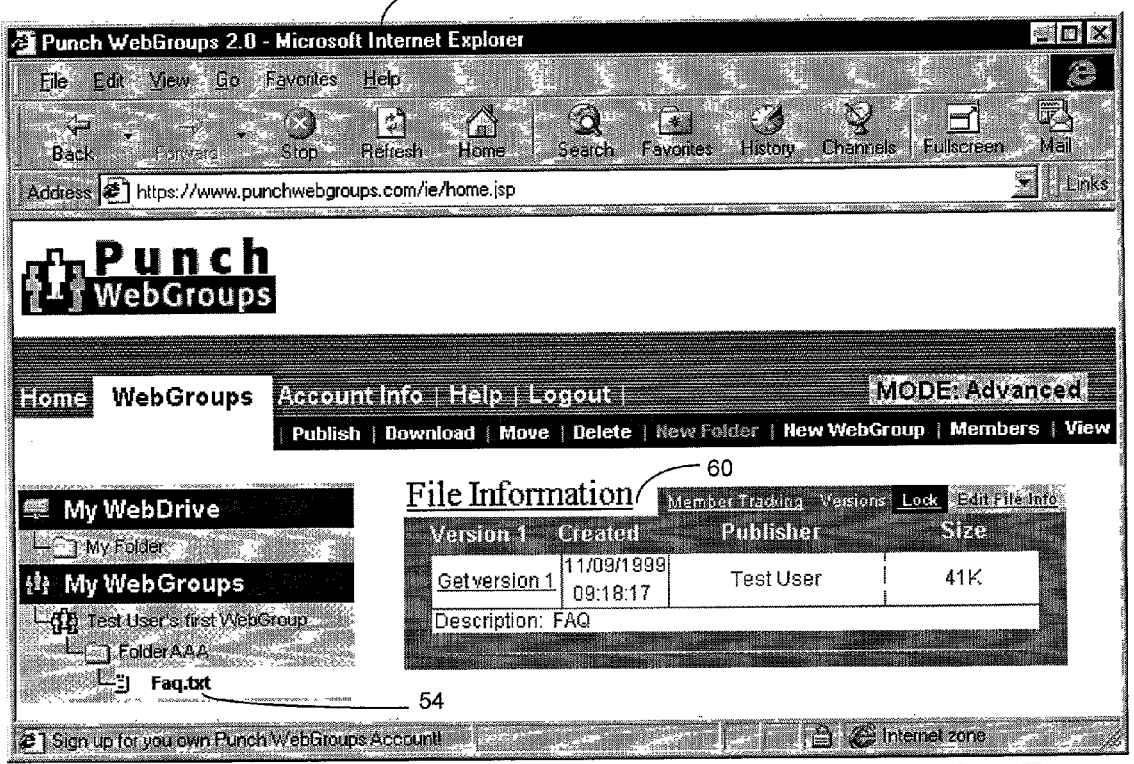

Referring now to FIGS. 4A-4B, the publication of file 54 is reflected in webgroup tree 44. If the user selects the file 54, the file information display 58 is provided. The file information display 58 provides information regarding the selected file, including the name, description, size, and creator of the file 54. The file information display 58 also provides the status of the version of the file on the client computer. In this manner, the user will be notified if the client computer does not contain an up-to-date version of the file. The file information display 58 also includes the location of the file on the client computer's local disk. The location of each file on the client computer is maintained so that the user will not need to be prompted when publishing a new version of the file or downloading a more recent version.

With file 54 still selected, the user may select the menu item for providing a file version display 60. The file version display 60 identifies each version of the file stored on the WebGroups WWW site, the date each file was created, the publisher of each file, and the size of the version information. By selecting from the versions identified in file version display 60, the user may select to download any previous or subsequent version of the file. Upon selecting a version from the file version display 60, punch server 32 will identify and transmit the delta file(s) required to modify the version of the file stored on the client computer to the version selected. If the client computer does not have any previous or alternate version of the selected file stored, the delta file(s) comprising the entire file will be transmitted to the client computer.

Figure 5A:
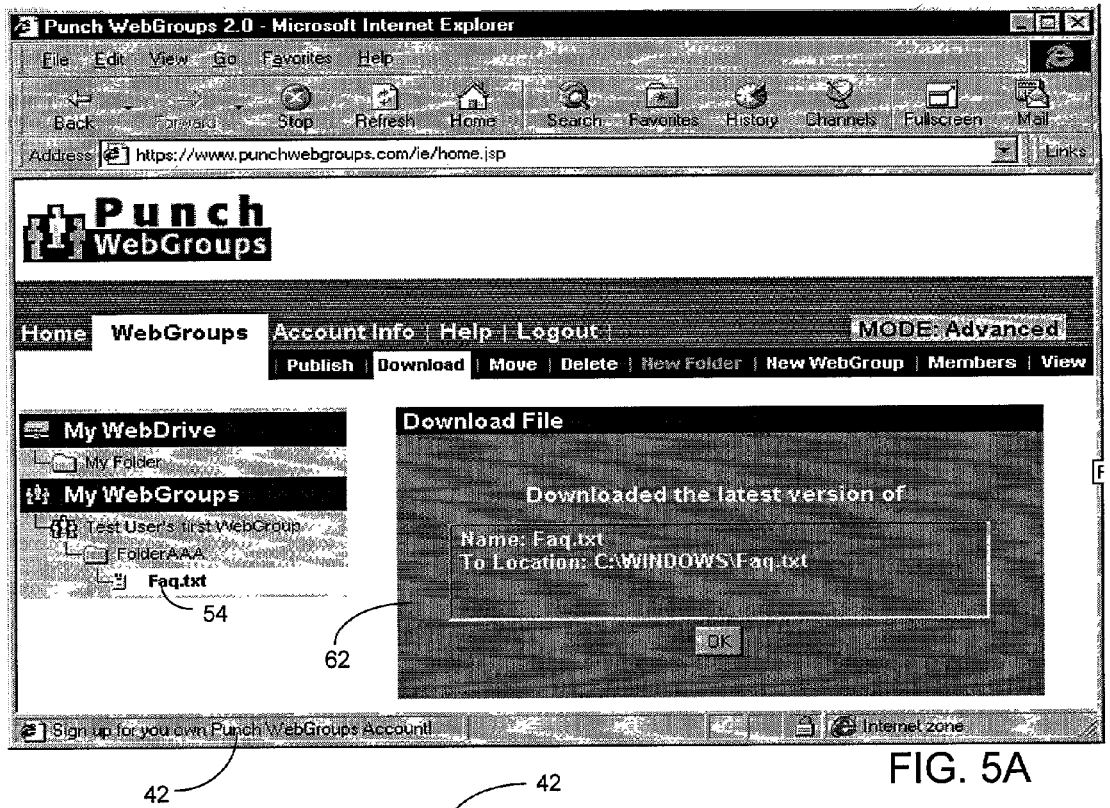
FIGS. 5A-5B illustrate windows produced by a WWW browser installed on a client computer and used to browse a WWW site embodying an actual embodiment of the present invention.
Figure 5B:
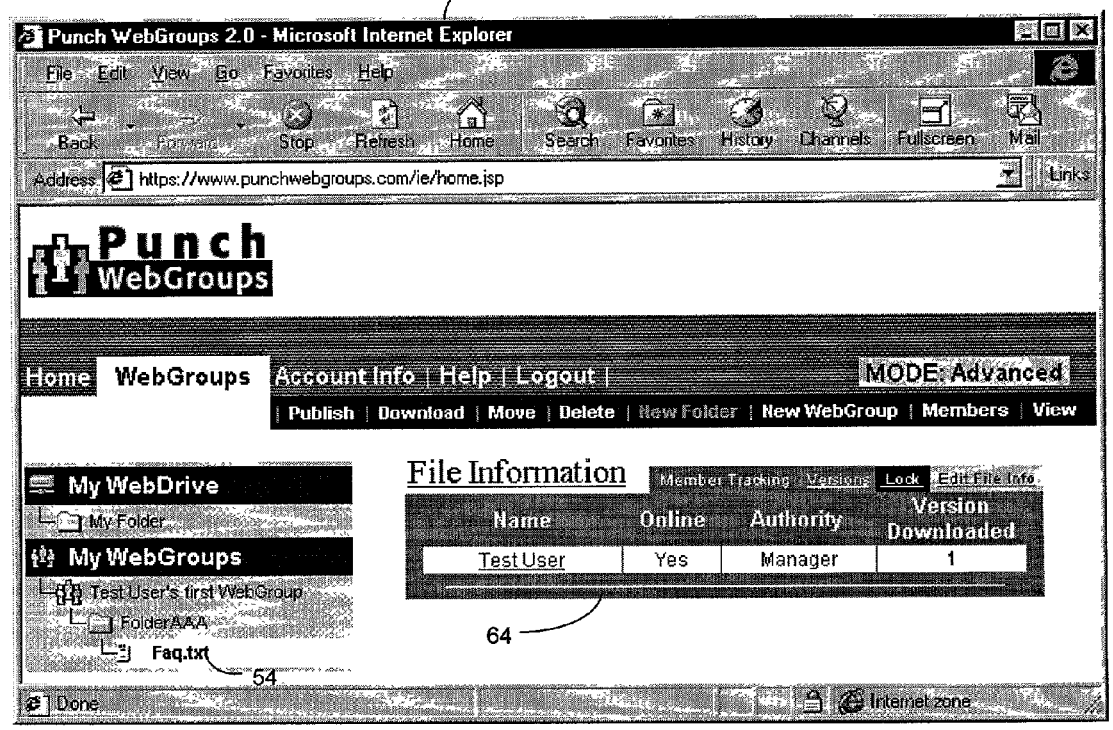

Referring now to FIGS. 5A-5B, the user may download the latest version of the file 54, by selecting the file 54 and then selecting the action bar menu item "download." The differences between the latest version stored on the server and the version stored on the user's client computer are then transmitted to the client computer. If the client computer does not have a previous or alternate version of the selected file stored, the differences comprising the entire file are transmitted to the client computer. A software application program running on the client computer combines the differences with the version on the client computer to create the latest version. Once the download has been completed, the download information display 62 is presented to the user which confirms that the download was successfully completed. An illustrative method for downloading files is described in more detail below with reference to FIGS. 10A-16.

With the file 54 selected, the user may also select the action bar menu item "members." The file authority display 64 is then provided, which allows the user to identify the other members of the webgroup that have access to the selected file 54 or folder. The user may add new members and set the authority levels for each member. The user is also asked to provide the e-mail address or other contact information for each member. The user may type this information in directly, or may search for this information using the LDAP server 33. Using this information, members of the webgroup will be invited, and may be notified and updated, when new files or versions are published to the webgroup.

Figure 6:
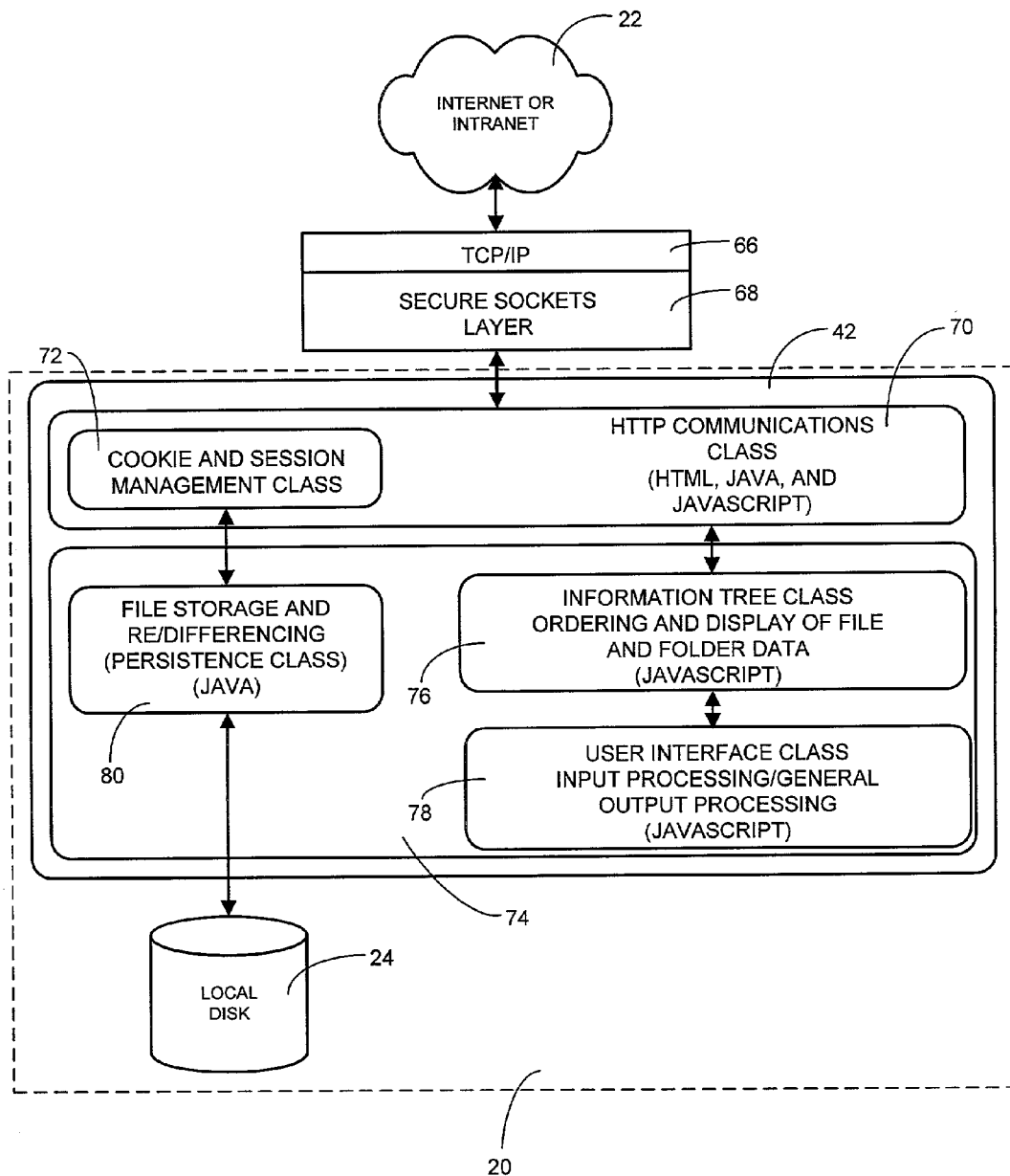
FIG. 6 is a block diagram illustrating the software architecture of a client computer embodying an actual embodiment of the present invention.

Referring now to FIG. 6, an illustrative software architecture of client computer 20 embodying aspects of the present invention will be described. Client computer 20 executes WWW browser 42, which allows the computer to connect to the WebGroups WWW site over the Internet (or Intranet) 22. The webgroups application software 74 executes in conjunction with WWW browser 42 and utilizes client computer's 20 Transport Control Protocol/Internet Protocol ("TCP/IP") service 66 to enable this connection.

TCP/IP is the standard protocol used on the Internet 22 for creating stream connections between two computers and is well known to those skilled in the art. TCP/IP provides the ability to connect two computers together if they are both connected to the Internet, are reachable over the Internet (i.e., they are not hidden behind a firewall), or reachable via proxy server (i.e., via an Internet reachable server which makes and receives requests on behalf of clients behind a firewall), and they have a unique, valid Internet Protocol ("IP") address. To connect to the WWW server 30 (shown in FIG. 1), the user of WWW browser 42 enters the WebGroups Uniform Resource Locator ("URL") address (e.g. http://www.punchwebgroups.com) into the address window (not shown) of WWW browser 42. This URL is translated into a unique IP address (e.g. 204.182.34.2) by the Internet Domain Name Service ("DNS") service. If WWW server 30 is found, a stream connection is created between the client computer 20 and WWW server 30 that allows interaction with the WebGroups WWW site.

The Secure Sockets Layer ("SSL") protocol 68 is built on top of the TCP/IP layer. The SSL protocol 68 encapsulates all data sent between the computer and the server thereby providing authentication, data integrity, and privacy. Authentication may be either unidirectional or mutual. For example, a challenge may be presented by the WWW browser 42, to which the WWW server 30 must respond with a valid, digitally signed digital certificate. This certificate must be signed by a known certificate authority root certificate, or a new root certificate for the signing authority must also be sent to the client computer 20. The WWW browser 42 verifies the validity of the digital certificate by verifying the digital signature on the server certificate and the root certificate and any other certificates in the certificate hierarchy. If the certificate is valid, the SSL protocol 68 may proceed. Mutual authentication requires a certificate for both the WWW server 30 and the WWW browser 42, and both sides of the communication perform the validity checks.

Data integrity is provided by the SSL protocol 68 by attaching unique data (known as a "MAC" to those skilled in the art) to each packet sent over the network. This unique data is created via a secure one-way hash function. As each packet arrives, the data is passed through the one-way function and compared with the MAC. This guarantees that the data has not been corrupted during transmission. The data is secured by encrypting each packet with a uniquely generated symmetric session key. The session key is then encrypted with the recipient's public key. The recipient decrypts the session key, then uses this key to decrypt the data in each packet. The SSL protocol 68 thus secures the communication between the WWW browser 42 and the WWW server 30 in an end-to-end fashion.

The WWW browser 42 provides a method of sending and receiving information from the user computer to other computers over the Internet 22. HTTP communications class 70 provides a standard mechanism for sending and receiving HTML documents. These documents are displayed to the user by WWW browser 42. Those skilled in the art will appreciate that other types of application programs such as client-resident applications, operating system "plug-ins," or application extensions may be used to provide this functionality. WWW browser 42 also accesses a mechanism to store persistent data to a local disk 24 located on client computer 20, called a cookie class 72. Cookie class 72 is also used to create unique user sessions with the webgroups server and other Internet services.

To create a unique user session, WWW server 30 creates a random string of bits for each user accessing the server and writes this information into a cookie. The cookie is sent to the WWW browser 42 and stored in a cookie "cache" located on local disk 24 of the client computer 20. Each time the user accesses WWW server 30, the cookie is sent to the WWW server 30 with the HTTP request. WWW server 30 uses the data contained in the cookie to look up the user's information. Cookies provide the ability to "expire"; that is, to be deleted after a certain period of time defined by the cookie creator, thus providing a mechanism for session timeout. Cookies are used in an embodiment of the present invention for session management and for caching the user's User ID. The use and implementation of cookies is well known to those skilled in the art.

WebGroups application software 74 is downloaded to WWW browser 42 when the WebGroups WWW site is first accessed. Among other features, WebGroups application software 74 provides the webgroups tree display 44 to the user. When the webgroups client application is a WWW browser, a preferred embodiment of the webgroups application software 74 consists of a Java Applet for File Storage and recombination/differencing, persistence class 80, and a combination of HTML and JAVASCRIPT for user interface class 78 and information tree class 76. As described above, the webgroups tree display 44 provides a hierarchical list of webgroups, folders, and files to the user in the output window of WWW browser 42. The user may manipulate the webgroups tree 44 (shown in FIGS. 2A-2B), by opening and closing nodes, or drilling down to any desired file or folder. Only the set of nodes available to the user is transmitted to the WWW browser 42 and displayed to the user by WebGroups application software 74. Other nodes that may exist on the WebGroups WWW site but that the user does not have authority to view are not displayed to the user.

User interface functions for implementing WebGroup actions, such as creating a new webgroup, publishing a file, or downloading a file, are implemented by user interface class 78. When the webgroups client application is a WWW browser, the user interface class 78 is created on WWW server 30 and sent to the WWW browser 42 for display. User interface class 78 displays information about selected nodes, members attached to a node, and other details. It also allows the user to create, modify, and delete data in the information tree.

Persistence class 80 provides functionality for differencing and recombination. As described in more detail below, this class allows the WWW browser 42, and webgroups application software 74 to read and write files from local disk 24, to publish files from local disk 24 to the WWW server 30, and to download files from WWW server 30 to local disk 24. When publishing files, persistence class 80 creates delta files containing the differences between the old and modified versions of the file being published, and sends this delta file to WWW server 30. If the file is being published for the first time, the entire file will be sent as one delta file. When downloading files, persistence class 80 attempts to download a delta file if client computer 20 already contains a previous version of the file. This delta file is recombined with the older version on local disk 24 to create the new version. If the file is not found, persistence class 80 will request that WWW server 30 send the entire file. Illustrative routines for publishing and downloading modules are described in greater detail below with reference to FIGS. 11A-11B and 12.

Figure 7:
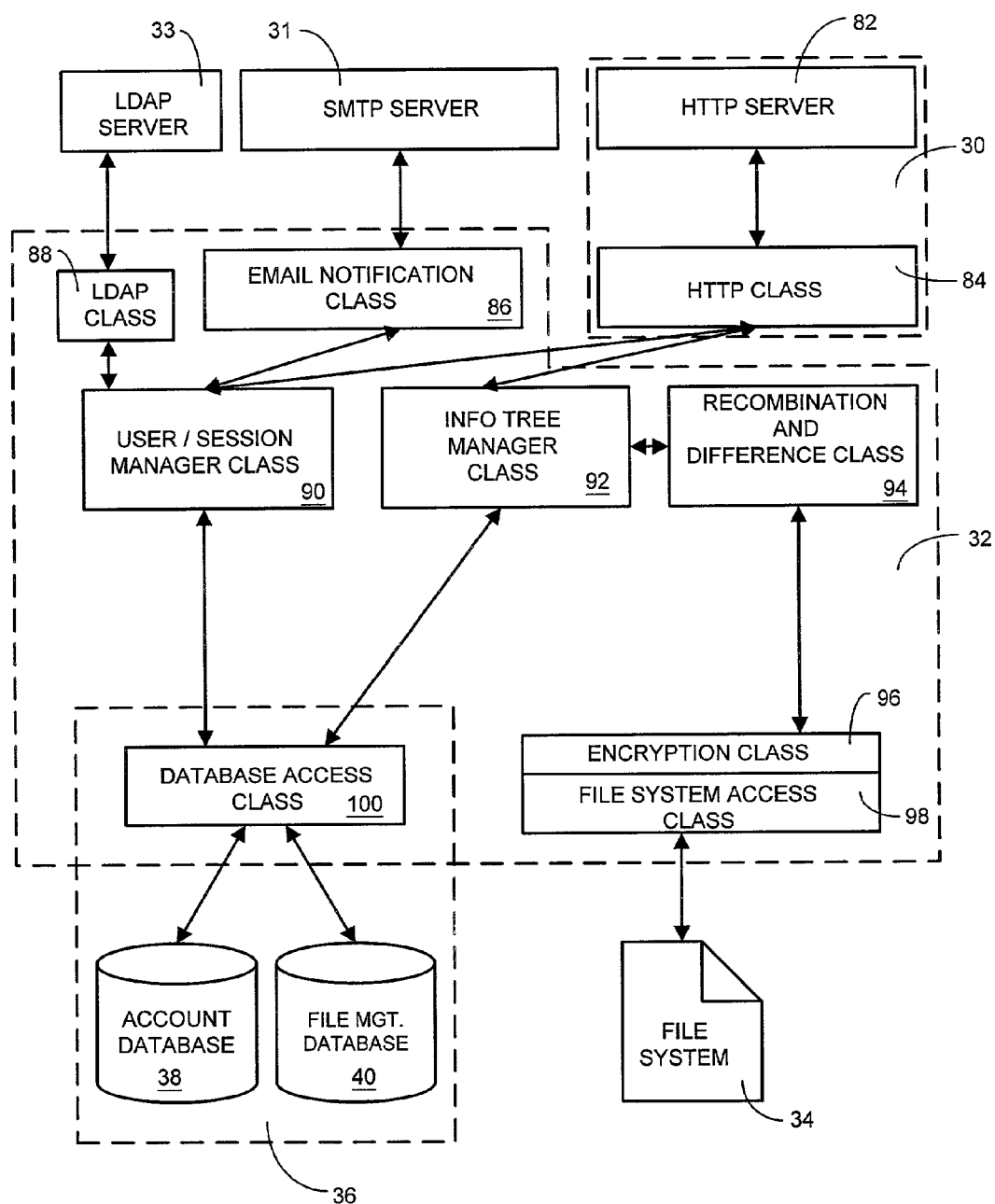
FIG. 7 is a block diagram illustrating the software architecture of a server computer embodying an actual embodiment of the present invention.

Referring now to FIG. 7, an illustrative software architecture for the WebGroups WWW site will be described. WWW server 30 includes an HTTP server 82 that responds to standard HTTP requests such as Put, Post, and Get from WWW browsers running on computers attached to the Internet. HTTP server 82 responds to these requests with static or dynamic HTML pages or other data. HTTP servers are well known to those skilled in the art.

HTTP class 84 captures specific HTTP requests and forwards them to components embodied in punch server 32. If HTTP server 82 receives a request that is specially tagged or that it cannot understand, it uses the HTTP class 84 to service the request. The HTTP class 84 communicates with components in punch server 32 via the Java Remote Method Invocation ("RMI") protocol, which allows the punch server 32 components to reside on any server with which the HTTP server 82 can communicate.

User/session manager class 90 creates, retrieves, and updates user account information. This class is also responsible for user account creation, user login, logout, session management, and user invitations and notifications. When a new user account is created, the account data (user name, ID, password, e-mail address, etc.) is sent to the HTTP server 82, which it forwards to the HTTP class 84. The HTTP class 84 uses RMI to connect to the user/session manager class 90, which then uses the database access class 100 to store the new account information in the account database 38. The user/session manager class 90 is responsible for maintaining the data integrity of the user information stored in the database, performing error and uniqueness checks on all data to be stored.

When an existing user attempts to log into the WebGroups WWW site, the user/session manager class 90 is queried to determine the validity of the user's ID and password. This class queries the database to look up the user's information. If the ID and password are valid, the user is allowed to log in. An entry for the user is then added to the session manager and a unique session cookie is generated and sent to the user's WWW browser. The session table tracks which users are logged into the WebGroups WWW site. The session manager keeps track of which users are active and which are idle in a session table. After a configurable period of inactivity, the user is removed from the session table. If the user attempts another action, the user must first log in before any action may be performed. When a user logs out from the WebGroups WWW site, their ID is removed from the session table.

User/session manager class 90 is also used when a new webgroup is created. The user creating the webgroup may either enter the data for each user to be invited to the webgroup manually, or they may query the user/session manager class 90 to look for groups of users using the Lightweight Directory Access Protocol (LDAP) class 88. The LDAP class 88 queries an external LDAP server 33 to retrieve user or group information, which is returned to user and used in creating or editing the members of a webgroup.

After a user is logged into the WebGroups WWW site, the information tree class 76 (shown in FIG. 6) requests that the webgroups tree be transmitted to the WWW browser 42. The information tree manager class 92 is queried by the HTTP class 84 to dynamically create the webgroups tree. The user's session key cookie is used to query the file management database 40 to look up the nodes that the user has authority to view. A hierarchical tree is created of these nodes, which is then returned to the user. The information tree class 76 in WWW browser 42 (FIG. 6) receives this tree and displays it to the user.

When a new file is published, the filename, contents (a delta file), and an optional description are sent from WWW browser 42 to HTTP server 82, which forwards it to the HTTP class 84, which then forwards it to the recombination and difference class 94. This class uses the information tree manager class 92 to verify that another file with the same name has not already been published into the same level of the tree. If not, the delta file contents are sent to the encryption class 96, where they are encrypted for storage on the file system 34. The file system access class 98 creates a new directory structure for the file, and writes the contents to the file system 34. The information tree class 92 is sent the filename, location, description, size, creator, creation date, and other identifying information about the file, which is stored in the file management database 40. The user publishing the file and all other users associated with the webgroup into which the file was published are added to the file management database 40, with their version downloaded information set appropriately. Next, each user is sent an e-mail notification of the new file. The user/session manager class 90 sends the invitation information to the e-mail notification class 86, which uses an external Simple Mail Transfer Protocol ("SMTP") server 31 to send the notification messages. Additionally, the user/session manager class 90 may send the information to the HTTP class 84, which would then communicate with the HTTP server 82, which may initiate communication with other members of the webgroup for transmitting new files and updates to existing files.

A similar procedure to that described above is used for downloading files. HTTP class 84 sends a download request to the information tree manager class 92, which determines the version of the file the user currently has. Recombination and difference class 94 is used to retrieve the correct version(s) from the file system, build the desired version, and transmit it to client computer 20.

Figure 8A:
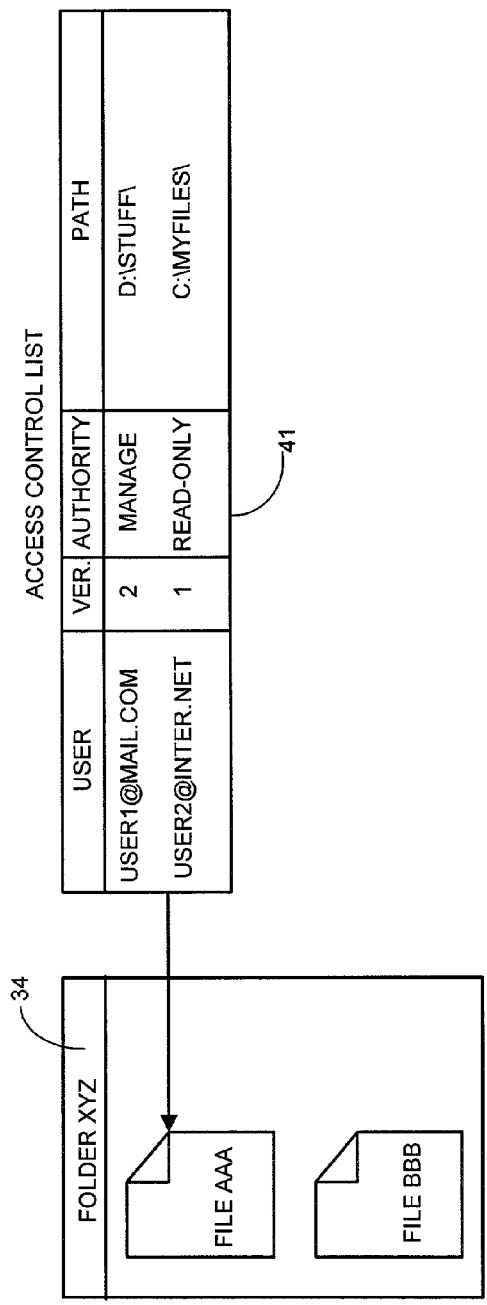
FIGS. 8A-8B illustrate an access control list utilized in an actual embodiment of the present invention to determine user file and folder permissions and locations.
Figure 8B:
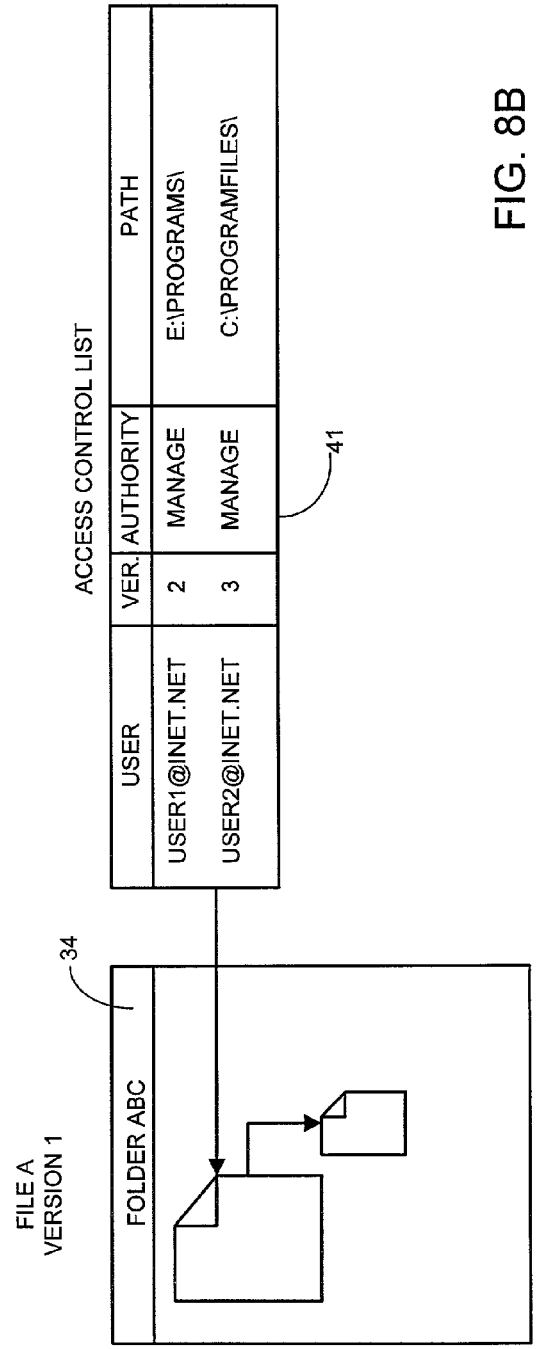

Referring now to FIG. 8, an illustrative account database and file management database utilized in an embodiment of the present invention will be described. Account database 38 and file management database 40 are used by the information tree manager class 92 (shown in FIG. 7) to determine which user is allowed to view, download, or publish nodes in the webgroup tree. Files are published into folders or webgroups 34. Webgroups are a special type of folder. All folders and files are virtual on the WebGroups WWW server; that is, there is no concrete representation of the folder and file hierarchy stored on the file system 34. Rather, the data resides only in the file management database 36. Any number of folders may be created, in any desired nesting hierarchy. Associated with each folder and file in the system is an access control list ("ACL") 41 stored in file management database 40, which creates a mapping between the folder or file and the users that have access to the folder or file. The set of users in the ACL is created when a new webgroup is created. All folders and files (nodes) within the webgroup have the same set of user associated with them. However, the ACL for each folder and file within a webgroup may be customized.

Each user has a single authority on every node within a webgroup. This authority may be manage, publish, subscribe, or limited. Limited is the lowest authority level and does not allow the user to view or access the node. Subscribe allows the user to view the information, download it, but not publish new information. Publish authority adds the ability to create new folders inside the node and to publish new files and versions. Manage authority adds the ability to delete the node and all of its children, to add and delete members, and to modify their existing authorities.

File user information is associated with each ACL that contains the current state of the file on the user's local disk 24. If the user has already downloaded a version of the file to their local disk, the ACL is modified to contain the version number the user has downloaded, when they downloaded it, and where it is stored on their local disk. This information is kept up to date each time a user downloads or publishes a new file or version, and is used both to build the set of nodes to send to the user in the webgroups tree, and to send notifications and updates to all appropriate users in the ACL.

Figure 9:
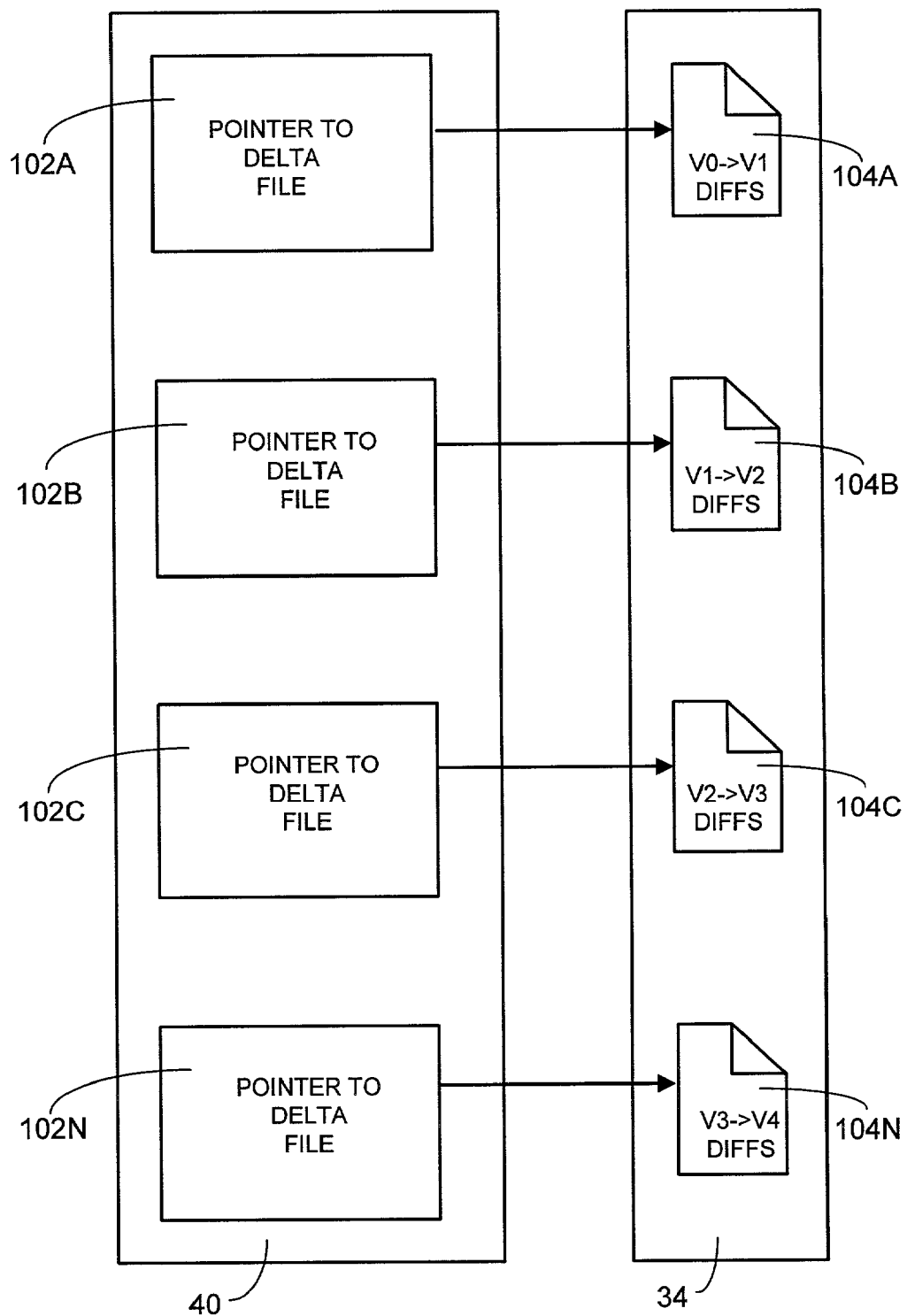
FIG. 9 illustrates a server file system utilized in an actual embodiment of the present invention for maintaining delta files.

Referring now to FIG. 9, an illustrative server file system embodying aspects of the present invention will be described. File management database 40 resides on database server 36 (shown in FIG. 1), and comprises pointers 102a-104n to delta files 104a-104n. Delta files 104a-104n are stored on punch server 32 as encrypted user files 34. Each delta file 104a-104n represents the differences between one version of a file and a subsequent version. Each delta file 104a-104n is published to a directory named with the hexadecimal representation of a unique database identifier associated with each delta file 104a-104n. Therefore, each version of a file resides in its own subdirectory. In order to minimize the random access memory required by the client and server machines participating in a publish operation, each file is partitioned into delta files 104a-104n as it is published. Punch server 32 stores delta files 104a-104n into their respective version subdirectories. As each delta file 104a-104n is written, the punch server encrypts the files as is well known to those skilled in the art. Punch server 32 also decrypts delta files 104a-104n as it reads them.

Figure 10A:
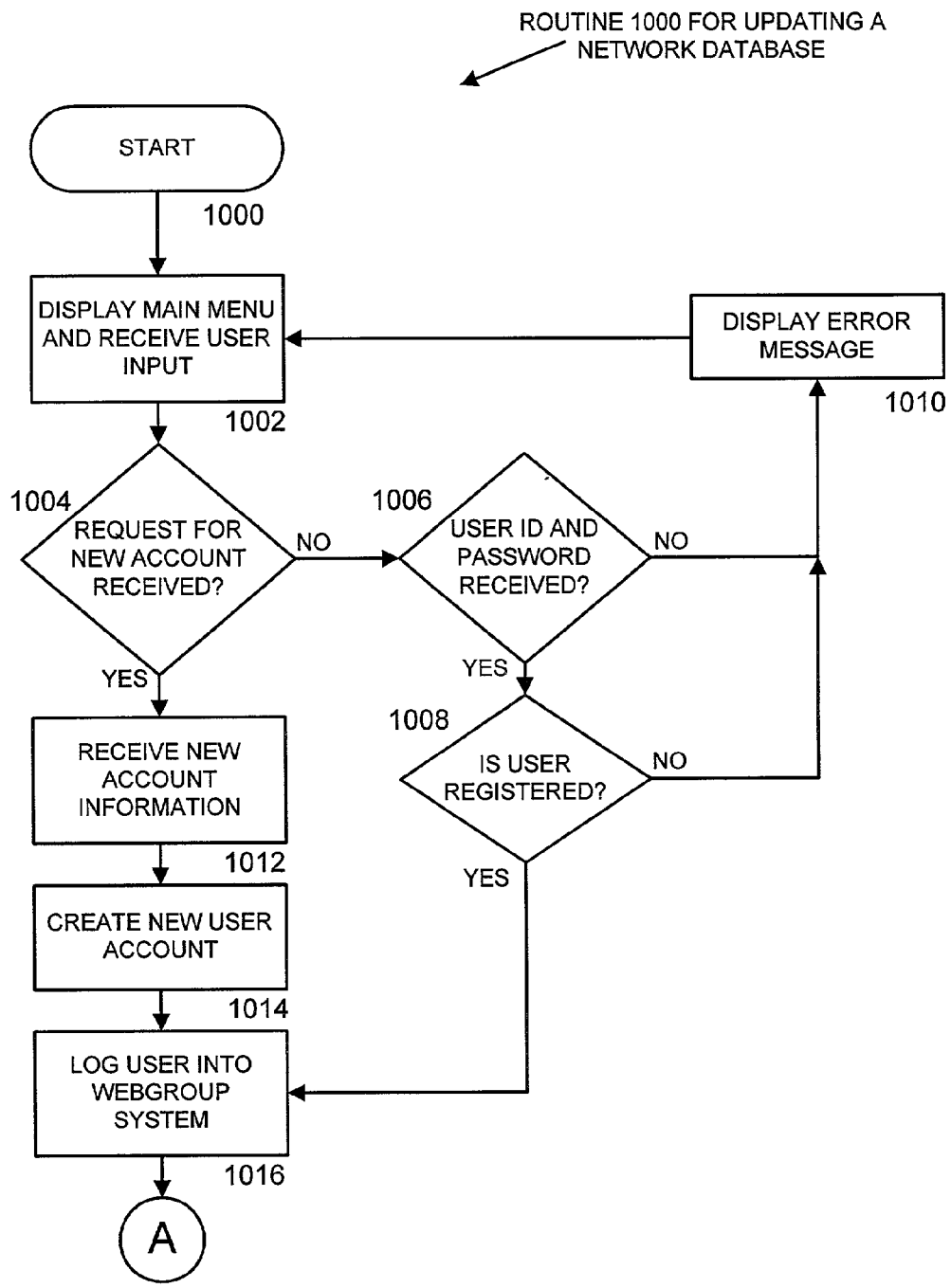
FIGS. 10A-10C are flow diagrams showing an illustrative method for updating a network database.

Referring now to FIG. 10A, the creation of a new Web-Groups account and logging into the WebGroups WWW site will be described. Routine 1000 begins at block 1002, where a main menu is displayed including a form into which the user must enter their WebGroups ID and password. At block 1004, a determination is made as to whether the user has requested a new user account. If the user has not requested a new account, Routine 1000 branches to block 1006, where a determination is made as to whether the user has supplied a Web-Groups ID and password. If the user has supplied an ID and password, a determination is made at block 1008 as to whether the user is registered. This is accomplished by querying the HTTP class 84. The HTTP class 84 queries the user/session manager class 90, which queries the database access class 100 to look up the user ID and password provided by the user. If the user ID matches that returned from the database, the password is hashed and compared to that returned. If the password also matches, the user is logged into the WebGroups WWW site. If either do not match, an error is presented to the user at block 1010, and the user is allowed to try again.

When a user has successfully logged in to the WebGroups server at block 1016, the user/session manager class 90 creates a new session object for the user. A unique, random string of bits is generated and inserted into the "Session Key" cookie by the server. This string is added to the user/session manager class 90 session table to provide a mapping between the Session Key and the User ID, and to provide a list of all users currently logged into the WebGroups WWW site. Real-time communications methods such as on-line chat, voice-based conversations, or some other "instant messaging" type of application, may be utilized to provide inter-user communication. The Session Key cookie is transmitted with each request from the webgroups client application 42 to the Web- Groups WWW site. This cookie is used by the user/session manager class 90 to retrieve the User ID that is then used to retrieve information from the database server 36 to display to the user.

If, at block 1004, it is determined that the user has requested a new account, the user is presented with a form into which they may provide their first name, last name, e-mail address, and their desired User ID and Password. At block 1012, this form is submitted to the WebGroups WWW site. The user/session manager class 90 then verifies the validity of the information presented. If the information is valid, the user/session manager class 90 queries the database server 36 for another account with the given User ID or e-mail address. If an account with the given User ID or e-mail address already exists in the database, an error message is returned to the user. If both are unique, the user account is created, a new record is added to the database, and the user is then logged into the WebGroups WWW site at block 1016.

Figure 10B:
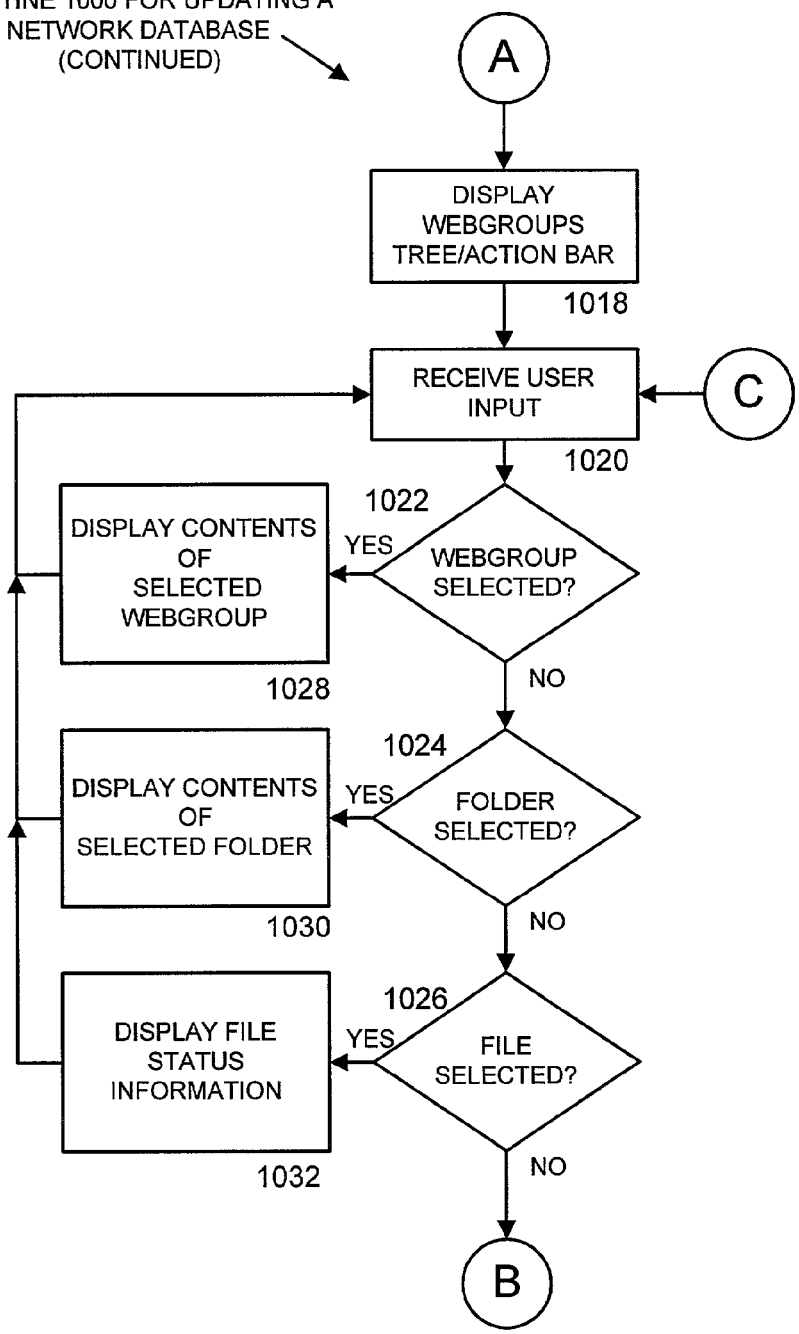

Referring now to FIG. 10B, Routine 1000 continues to block 1018, where the webgroup tree and action bar are displayed to the user. The information tree class 76 makes a request to HTTP server 82 to download the webgroups tree, it is important to note that this is a virtual folder and file hierarchy based upon each individual user, as the webgroups server 32 contains no direct mapping of folders and files for each user in the server file system 34. The information tree manager class 92 on the server is queried to build the webgroups tree for the user. The Session Key cookie is used by the user/session manager class 90 to retrieve the User ID, which is then used by the information tree manager class 92 to query the account database 38 to retrieve the set of webgroups, folders, and files (called nodes) to be displayed to the user. As described above, only those nodes to which the user has authority and access are returned, based on the nodes' ACLs 41. Nodes that the user has only Limited authority over are not returned. The set of nodes is returned to the WWW browser 42, where it is formatted by the Information Tree class 76 and displayed to the user in the browser window.

At block 1020, a user may provide input using a mouse, keyboard, or other user interface selection device. When a user selects a node in the webgroup tree displayed by the WWW browser 42, the information tree class 76 sends a request to the HTTP server 82 for information about that node. At block 1022, a determination is made as to whether a webgroup has been selected. If a user selects a webgroup, Routine 1000 branches to block 1028, where the information about the selected webgroup is retrieved by the information tree manager class 92 from the file management database 40, and is returned to the WWW browser 42, where the information tree class 76 formats it for display to the user. This information may consist of the webgroup name, description, creation date, creator, members associated with the webgroup, or nodes contained within the webgroup. If a determination is made at block 1022 that the user did not select a webgroup, Routine 1000 continues to block 1024.

At block 1024, a determination is made as to whether the user has selected a folder. If the user selects a folder, Routine 1000 branches to block 1030, where information about the selected folder is retrieved by the information tree manager class 92 from the file management database 40, and is returned to the WWW browser 42, where the information tree class 76 formats it for display to the user. This information may consist of the folder name, description, creation date, creator, members associated with the folder, or nodes contained within the folder. If, at block 1024, a determination is made that the user did not select a folder, Routine 1000 continues to block 1026.

At block 1026, a determination is made as to whether the user has selected a file. If the user has selected a file, Routine 1000 branches to block 1032, where information about the selected file is retrieved by the information tree manager class 92 from the file management database 40, and is returned to the WWW browser 42, where the information tree class 76 formats it for display to the user. This information may consist of the file name, size, description, creation date, creator, or members associated with the file. If, at block 1026, a determination is made that the user did not select a file, Routine 1000 continues to block 1034, shown in FIG. 10C.

Figure 10C:
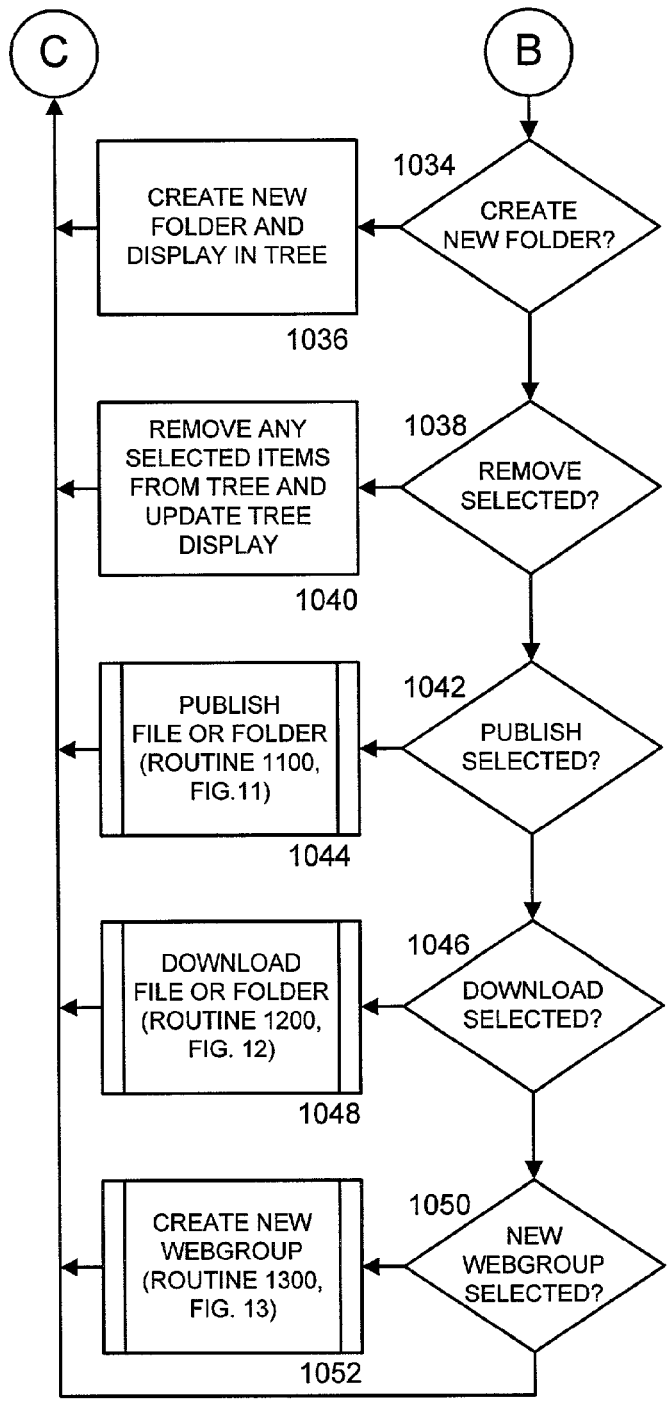

Referring now to FIG. 10C, a determination is made at block 1034 as to whether the user has selected a user interface button for creating a new folder. If the user has selected such a button, and the user has manage or publish authority on the selected node, Routine 1000 branches to block 1036. At block 1036, the user is prompted to provide a folder name and optionally a description for the new folder. Once the user submits this information, the new folder is created at the current selected location in the webgroups tree and is displayed to the user and to all other members of the associated webgroup. If, at block 1034, it is determined that the user did not select a user interface button for creating a new folder, Routine 1000 continues to block 1038.

A determination is made at block 1038 as to whether the user has selected a user interface button for deleting or removing the selected node. If the user has selected such a button, the Routine 1000 branches to block 1040. If the user has manage authority on the selected node, the user is prompted for confirmation of the deletion operation at block 1040. If the user confirms the deletion operation, the selected node and all its child nodes are deleted, and the webgroups tree is redrawn to reflect deletion. This operation performs the same for webgroups, folders, and files. If a file is deleted, all of its versions are also deleted. If, at block 1038, it is determined that the user did not select a user interface button for deleting an object, Routine 1000 continues to block 1042.

At block 1042, a determination is made as to whether the user has selected a user interface button for publishing a file or folder. If the user selects the publish button, and the user has manager or publish authority, the user is presented with one of two options depending on the selected node. If a file is selected, the user is prompted with a publish version form. If a folder is selected, the user is presented with a publish file form which allows the user to select and publish a new file from the local disk 24 into an existing folder or webgroup. The publish file form also has an additional button to "publish a folder". Publishing a version publishes a new version of a file that has already been published into the selected webgroup. If the user selects the "publish a folder" button, they will be allowed to select and publish an entire directory of files from the local disk 24 into a folder or webgroup. Block 1044 for publishing a file or folder is described in detail below with reference to FIG. 11. If the user has not selected a menu item for publishing a file or folder, Routine 1000 continues to block 1046.

At block 1046, a determination is made as to whether the user has selected a menu item for downloading the selected node. If the user selects the download button, and if the user has any authority other than limited, the user is presented with one of two options at block 1048. If a file is selected, the user is prompted with a download file form. If a folder is selected, the user is presented with a download folder form. The download file form allows a user to download a specific file to any location on their local disk. The download folder form downloads the contents of an entire webgroups folder to a given folder on the user's local disk 24. Block 1048 for downloading a file or folder is described in greater detail below with reference to FIG. 12. If, at block 1046, the user has not selected a user interface button for downloading the selected file, Routine 1000 continues to block 1050.

At block 1050, a determination is made as to whether the user has selected a menu item for creating a new webgroup. If the user selects the new webgroup button, the Routine 1000 branches to block 1052, where a new webgroup is created. An illustrative Routine 1300 for creating a new webgroup is described below with reference to FIG. 13.

Figure 11A:
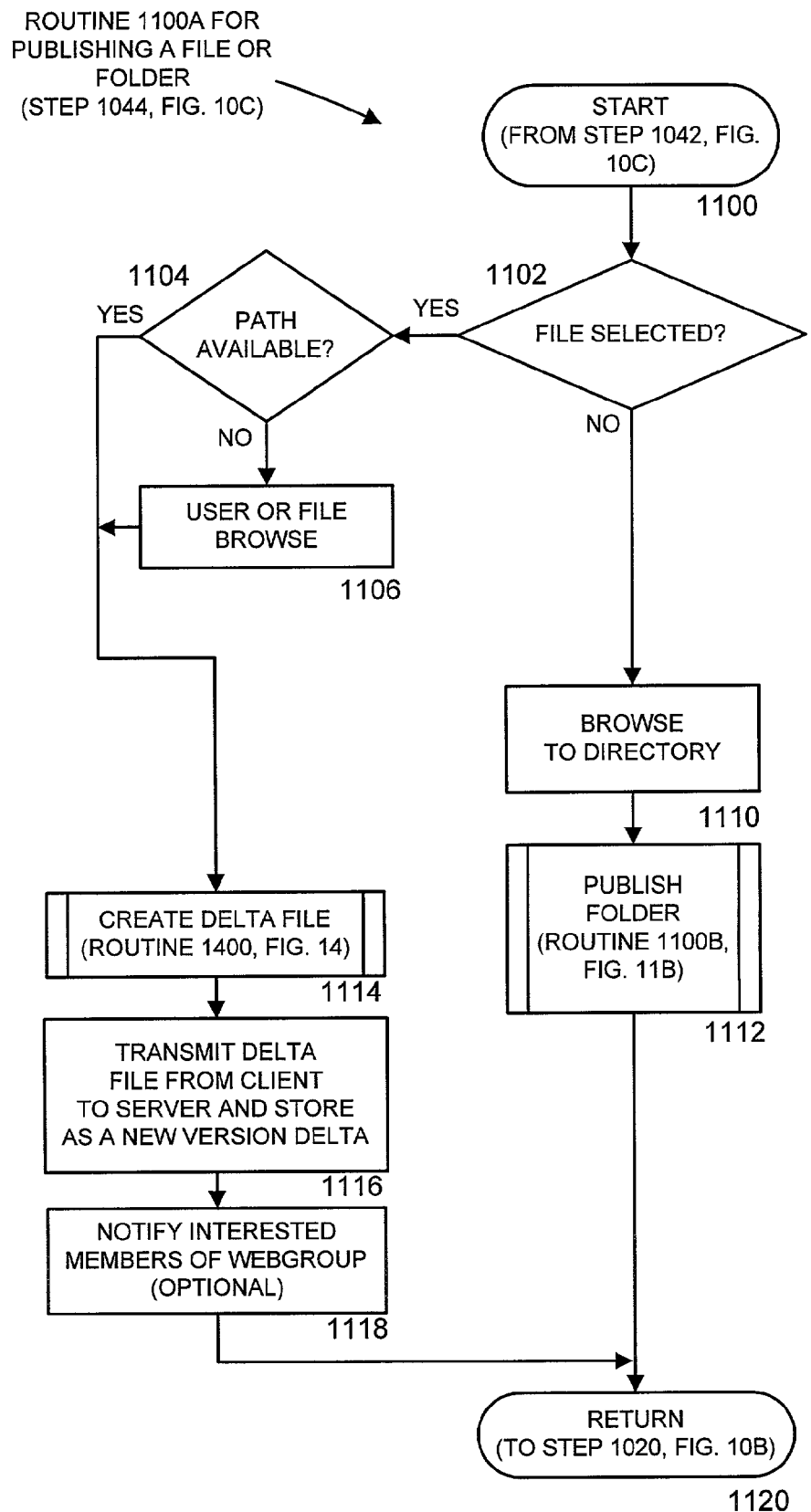
FIG. 11A is a flow diagram showing an illustrative method for publishing a file.
Figure 11B:
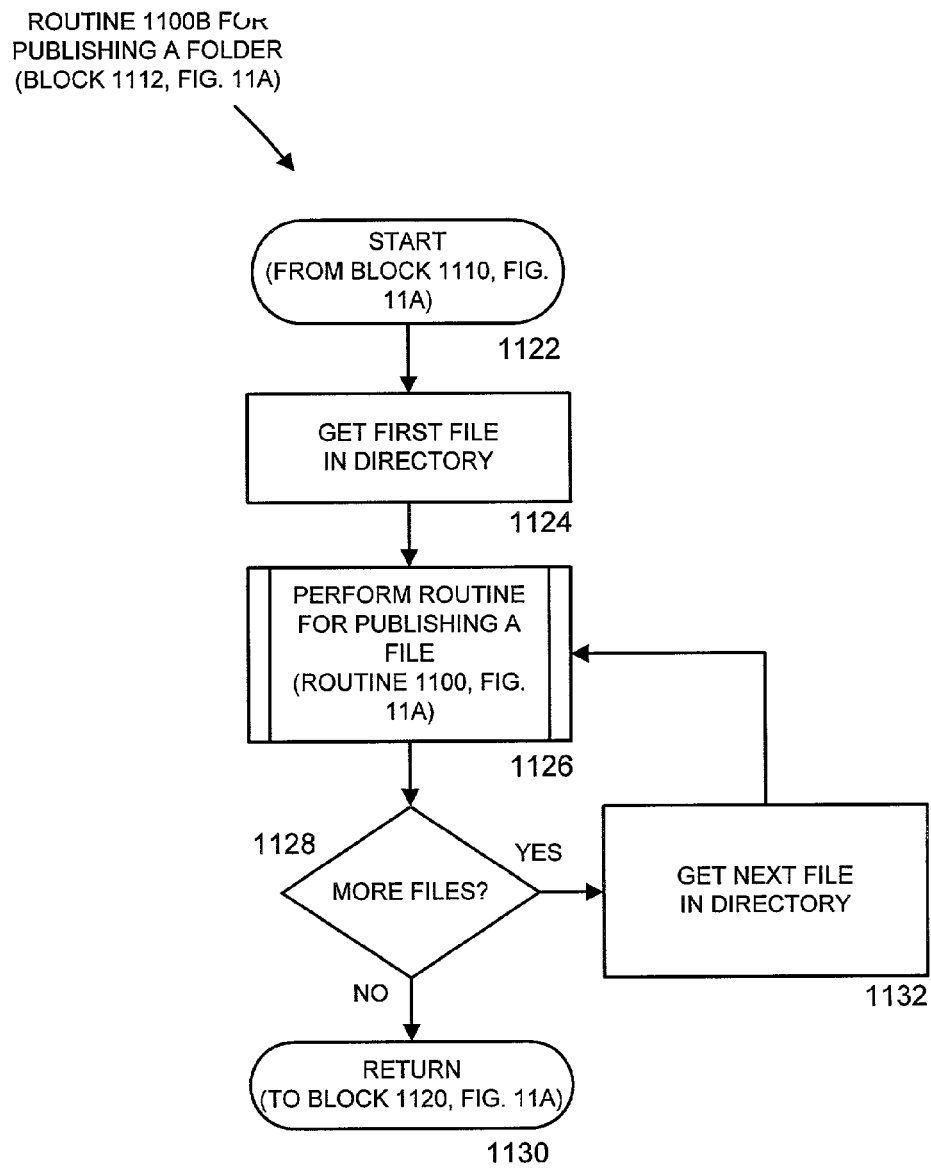
FIG. 11B is a flow diagram showing an illustrative method for publishing a folder.

FIGS. 11A-11B depict illustrative methods for publishing a file or a folder. Referring now to FIG. 11A, Routine 1100A for publishing a file will be described. Routine 1100A begins at block 1102 where a determination is made as to whether a file has been selected to be published. If a file has been selected to be published, Routine 1100A branches to block 1104, where a determination is made as to whether a path to a version of the file stored on client computer 20 is available. In order to determine the existence of a version of the file on the client computer 20, a hash value is calculated using a Secure Hash Algorithm, as is known to those skilled in the art, and is saved as part of each published file. If a path to a version of the file stored on the client computer is unavailable, Routine 1100A branches to block 1106, where the user is prompted to select the location of the file to be published. If a path to the version of the file is available, Routine 1100A continues to block 1114 without requesting the location of the file to be published from the user.

At block 1114, a delta file is created for the file to be published. An illustrative routine for creating the delta file is described below with reference to FIG. 14. Routine 1100A continues from block 1114 to block 1116, where the delta file is transmitted from the client computer 20 to the punch server 32, and stored on the server file system as encrypted user files 34. As a final confirmation of the publish operation, punch server 32 compares a hash calculated on the published file to the hash calculated for the same file by the client computer 20. At block 1118, an e-mail is sent to members of the webgroup to which the file was published, notifying them that a new version has been received. Communications may be initiated with each member of the webgroup to automatically transmit the delta file(s) required to update them to the new version.

If, at block 1102, a determination is made that a file has not been selected, Routine 1100A continues to block 1110. At block 1110, the user is prompted to identify a folder or directory to be published. Once the user has identified a directory to be published, Routine 1100A continues to block 1112. At block 1112, the selected directory is published to the punch server 32. An illustrative routine 1100B for publishing a folder is described below with reference to FIG. 11B. Routine 1100A continues from block 1112 to block 1120, where it returns to block 1020, FIG. 10B.

Referring now to FIG. 11B, Routine 1100B for publishing a folder begins at block 1124, where the first file in the directory is identified and selected. Routine 1100B continues to block 1126, where Routine 1100A for publishing a file is executed for the selected file. Routine 1100B continues to block 1128, where a determination is made as to whether more files remain in the directory to be published. If additional files remain to be published, Routine 1100B branches to block 1132, where the next file in the directory is selected. The next file is then published at block 1126. If no additional files remain to be published at block 1128, Routine 1100B continues to block 1130, where it returns to block 1120, FIG. 11A.

Figure 12:
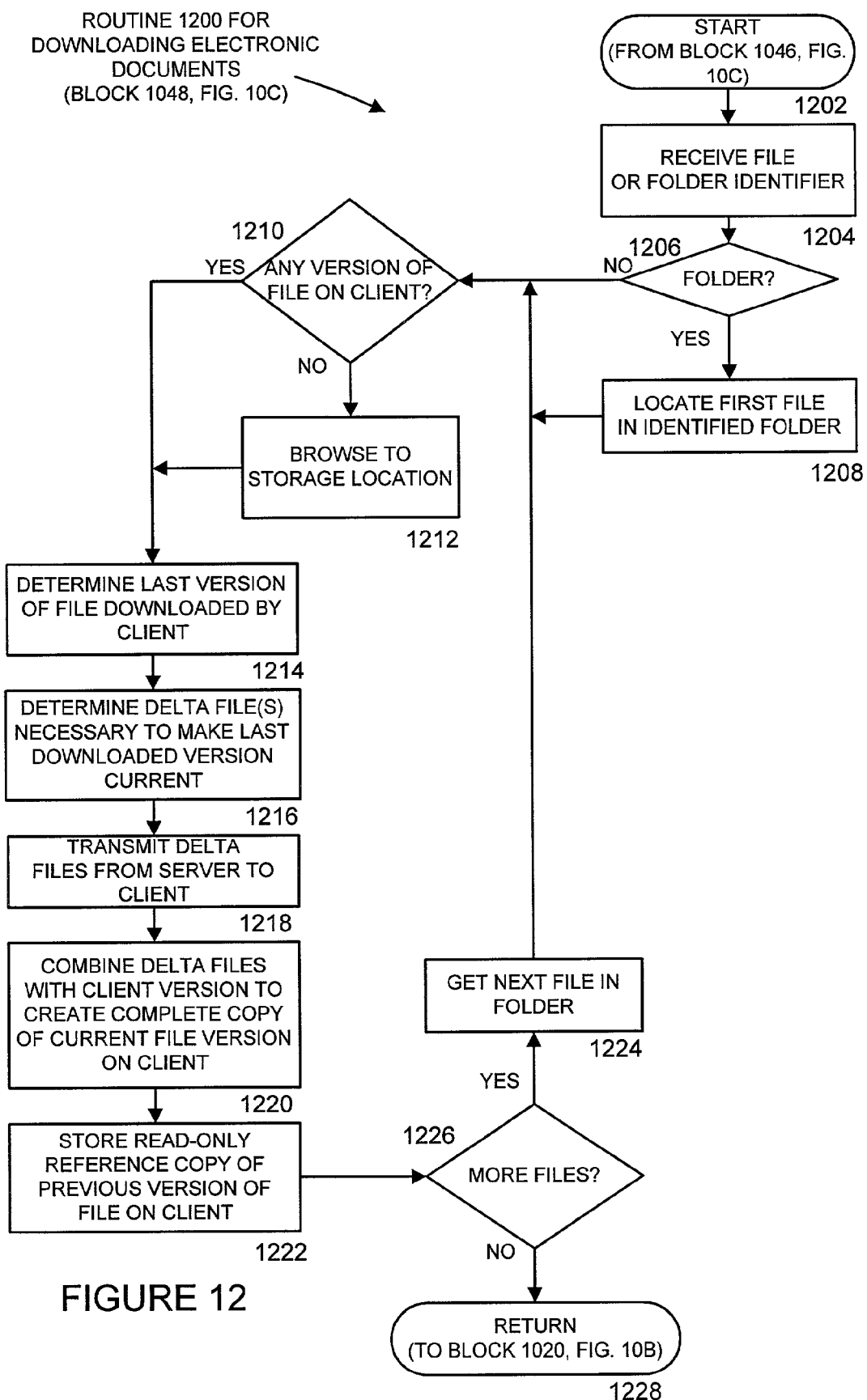
FIG. 12 is a flow diagram showing an illustrative routine for downloading an electronic document.

Referring now to FIG. 12, an illustrative Routine 1200 for downloading an electronic document will be described. Routine 1200 begins at block 1204, where a file or folder identifier is received that identifies the file or folder to be downloaded. At block 1206, a determination is made as to whether the user has selected a folder to be published. If the user has selected a folder, Routine 1200 branches to block 1208, where the first file in the folder is located. If the user has not selected a folder, Routine 1200 continues to block 1210.

At block 1210, a determination is made as to whether any version of the selected file exists on the client computer 20. If a version of the file exists on the client computer 20, Routine 1200 continues to block 1214. If no version of the file exists on the client computer 20, Routine 1200 branches to block 1212, where the user is permitted to identify a location on client computer 20 for storing the selected file. Routine 1200 then continues to block 1214.

At block 1214, the last version of the file downloaded by client computer 20 is identified. From block 1214, Routine 1200 continues to block 1216, where the delta file or files necessary to make the last version downloaded by client computer 20 current are identified. At block 1218, the delta files are transmitted from the punch server 32 to client computer 20. At block 1220, the delta files are combined with the client version of the selected file to create a complete version of the selected file on the client computer 20. At block 1222, a read-only reference copy of the previous version is stored on the client computer 20.

Routine 1200 continues from block 1222 to block 1226, where a determination is made as to whether additional files remain to be published. If additional files remain to be published, Routine 1200 branches to block 1224, where the next file is retrieved, and blocks 1210 through 1226 are repeated. If no additional files remain to be published, Routine 1200 continues to block 1228 where it returns to block 1020, FIG. 10B.

Figure 13:
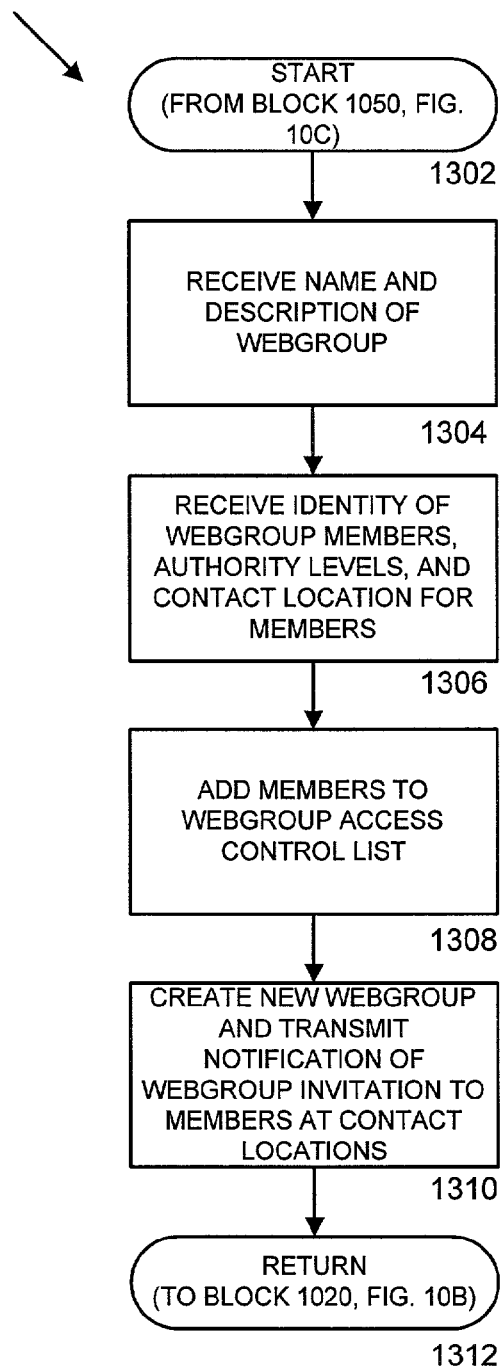
FIG. 13 is a flow diagram showing an illustrative routine for adding a new webgroup.

Referring now to FIG. 13, an illustrative Routine 1300 for creating a new webgroup will be described. As described above, webgroups are groups of users that have access to all information published into the webgroup. All webgroups are created by users and any user may create a new webgroup, provided they have not exceeded a predefined webgroup quota. At block 1304, a user provides a name for the webgroup, and optionally adds a description to it. From block 1304, Routine 1300 continues to block 1306, where the user may optionally provide the identity of additional users of the webgroup. Each user added will see this new webgroup in their webgroups tree when they next log into the WebGroups WWW site or, if they are already logged in, when their webgroups tree is refreshed. Additionally, at block 1306, the creator adds the name, e-mail address, and default authority level (Manage, Publish, Subscribe, or Limited) for each user that is to have access to the new webgroup. At block 1310, all of the webgroup information is sent to the HTTP server, where the user/session manager class 90 creates the new webgroup.

At block 1310, the user/session manager class 90 creates a new entry for the webgroup in the file management database 40, and creates a new ACL 41 for the webgroup using the database access class 100. For each user to be added to the webgroup, the database access class 100 is queried to determine if the user already has an account (using the e-mail address as the key). If the user has an account, they are added to the invitation list. If they do not have an account, a temporary account is created for the user along with a temporary user ID and Password. The user is then added to the invitation list. All users on the invitation list are sent an e-mail notifying them of the new webgroup using the e-mail notification class 86 and the external SMTP server 31. For new accounts, the users are also sent a new account creation message containing their temporary ID and Password. Any manager of a webgroup may delete the webgroup and all its contents. A manager may also modify existing user authorities, add new users to the webgroup, and delete existing users from a webgroup.

The LDAP server 33 may also be queried by the user to find groups of users based on name or regular expression matches. If the user searches for a regular expression, all matches found in the LDAP server 33 are returned to the user. The user may then select one of more of these groups to add to the webgroup. For every LDAP group added to the webgroup, each member of that group is added individually to the webgroup.

Figure 14:
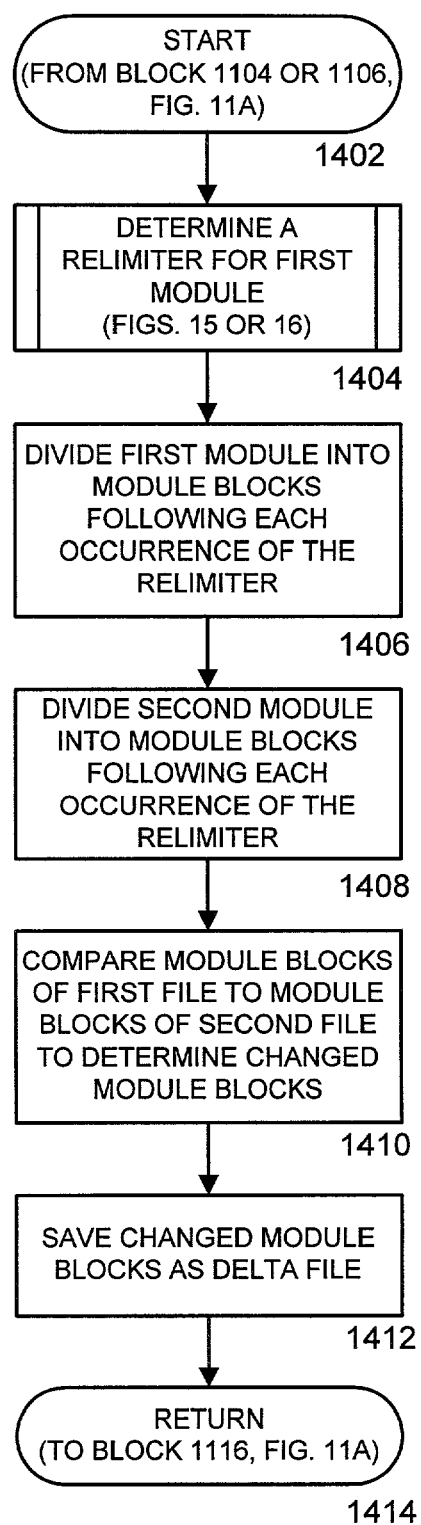
FIG. 14 is a flow diagram depicting an illustrative routine for creating a delta file.

Referring now to FIG. 14, an illustrative Routine 1400 for creating a delta file will be described. The output of Routine 1400 is a delta file comprising the differences between two modules. As used herein, a module means any logical or physical collection of data, including, but not limited to, a byte, a database record, a database table, a data file, a file system folder or directory, or a computer, or a logical collection of computers. Routine 1400 begins at block 1404, where a relimiter for a first module is determined. The relimiter comprises the most frequently occurring data in the module. Illustrative routines for determining a relimiter for a module are described below with respect to FIGS. 15 and 16.

Routine 1400 continues from block 1404 to block 1406, where the first module is divided into sections called module blocks following each occurrence of the relimiter. At block 1408, the second module is also divided into sections called module blocks following each occurrence of the relimiter. At block 1410, the contents of module blocks for the first and second modules are sequentially compared to determine which module blocks have changed between the first and second modules. At block 1412, the module blocks that have changed are saved and/or transmitted as a delta file. In an alternative embodiment, the changed module block(s) can also be saved and/or transmitted as individual delta file(s). At block 1414, Routine 1400 returns to block 1116, FIG. 11A.

Figure 15:
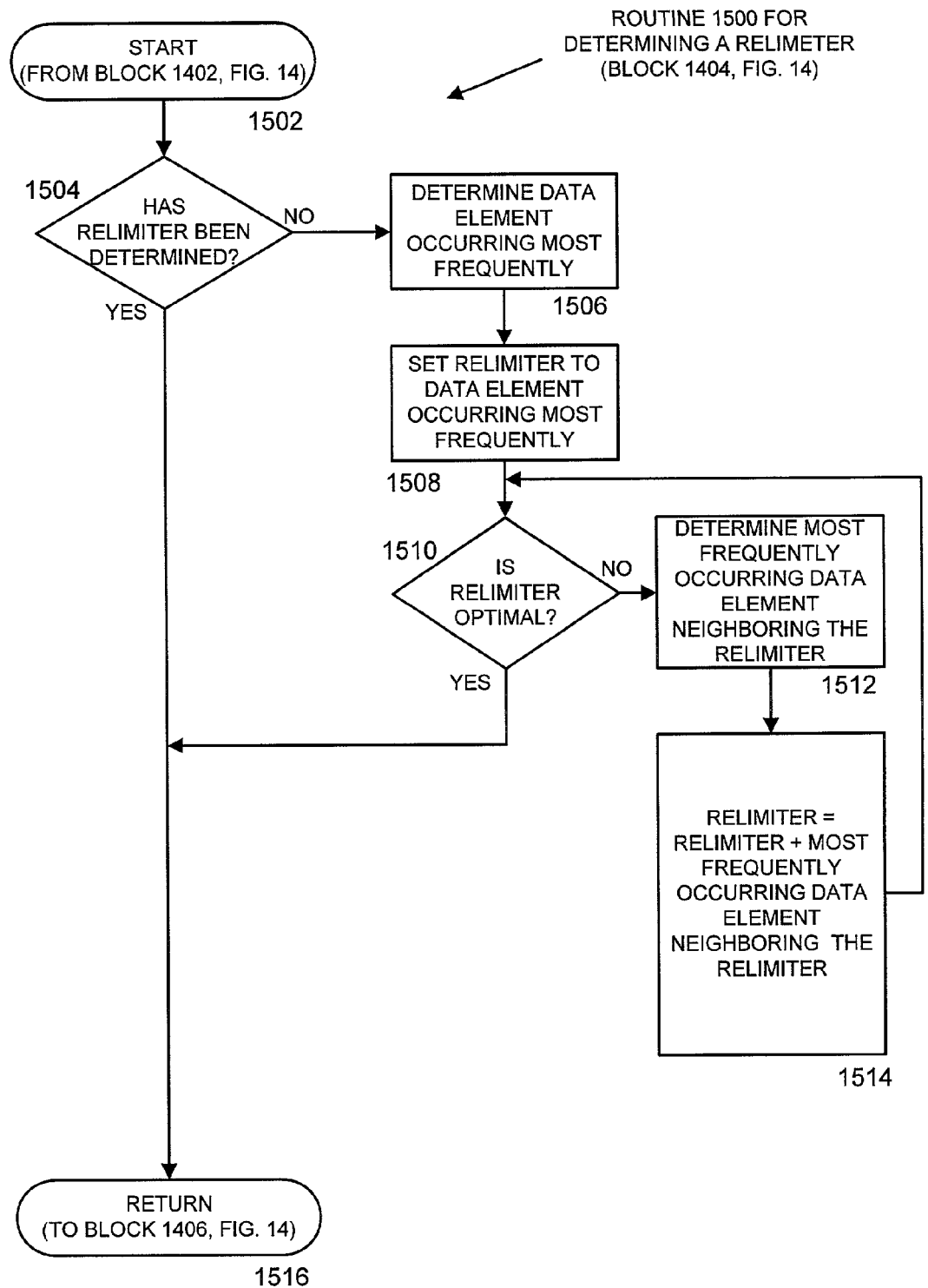
FIG. 15 is a flow diagram illustrating a method for determining a relimiter.

Referring now to FIG. 15, an illustrative Routine 1500 for determining a relimiter will be described. Routine 1500 begins at block 1504, where a determination is made as to whether a relimiter has been previously determined for the module. If a relimiter has been previously determined for the module, there is no need to re-calculate it. Therefore, Routine 1500 continues to block 1516, where it returns to block 1406, FIG. 14. If a relimiter has not been previously determined, Routine 1500 branches to block 1506.

At block 1506, the data element occurring most frequently in the module is determined. The data element may comprise a bit, byte, word, or other data element. The module may be scanned sequentially to determine the most frequently occurring data element. Routine 1500 continues from block 1506 to block 1508, where the relimiter is set to the most frequently occurring data element determined in block 1506. At block 1510, a determination is made as to whether the relimiter is optimal for the module. In an embodiment, this determination is made by determining the number of times the relimiter occurs in the module. The relimiter occurring the largest number of times is the optimal relimiter. Another factor used to determine the optimal relimiter may include the distance between occurrences of the relimiter. If the relimiter is optimal, Routine 1500 continues to block 1516. If the relimiter is not optimal, Routine 1500 branches to block 1512.

Figure 17:
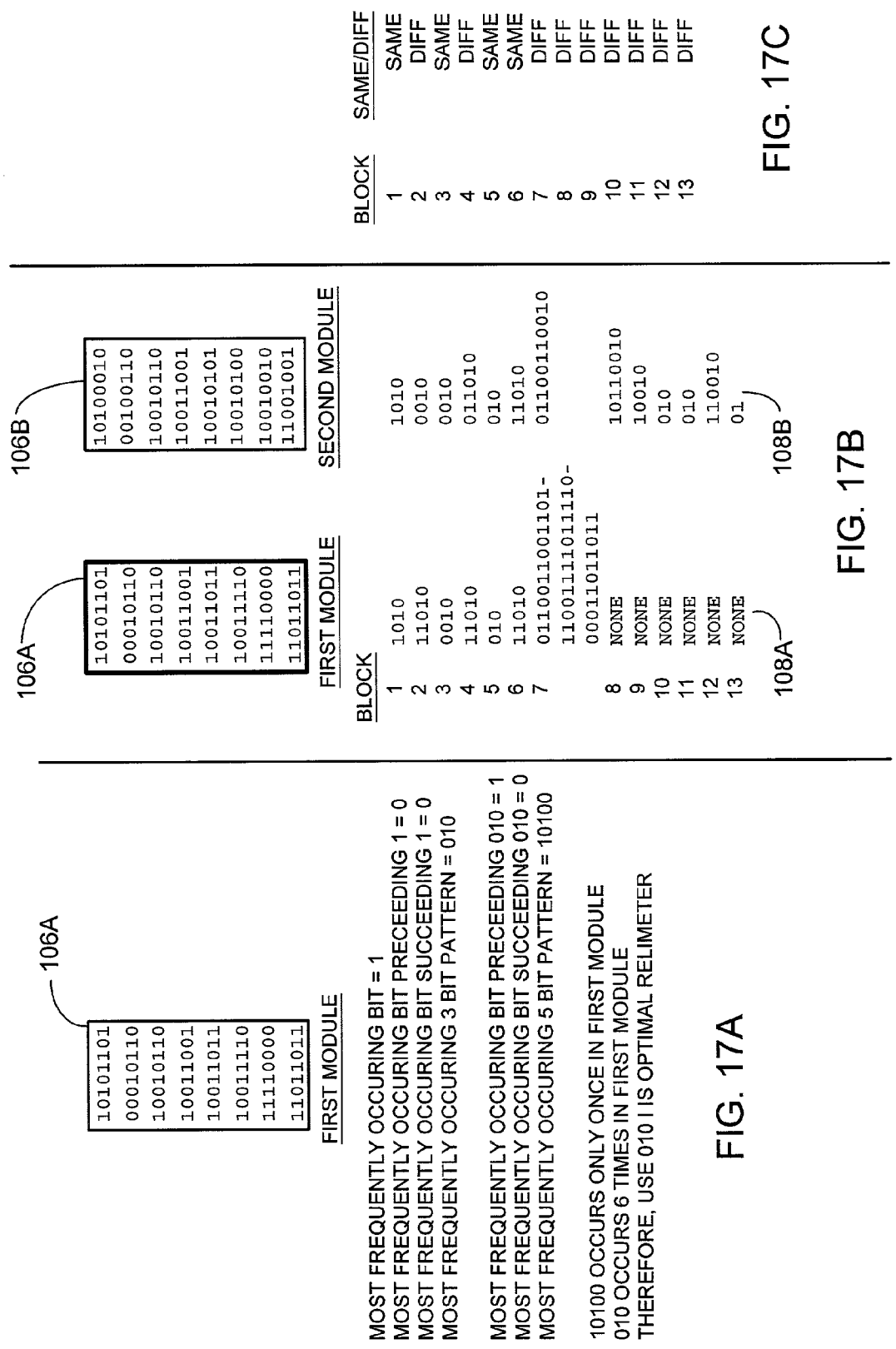
FIGS. 17A-17C is a pictorial diagram depicting the application of an illustrative method for creating a delta file to an example module.

At block 1512, the most frequently occurring data element neighboring the relimiter is determined. From block 1512, Routine 1500 continues to block 1514, where the relimiter is set to the concatenation of the relimiter and the most frequently occurring data element neighboring the relimiter. Routine 1500 then continues to block 1510, where another determination is made as to whether the relimiter is optimal. If the relimiter is not optimal, blocks 1512 and 1514 repeat. If the relimiter is optimal, Routine 1500 continues to block 1516, where it returns to block 1406, FIG. 14. An example of Routine 15 applied to an illustrative module is described below with respect to FIG. 17.

Figure 16:
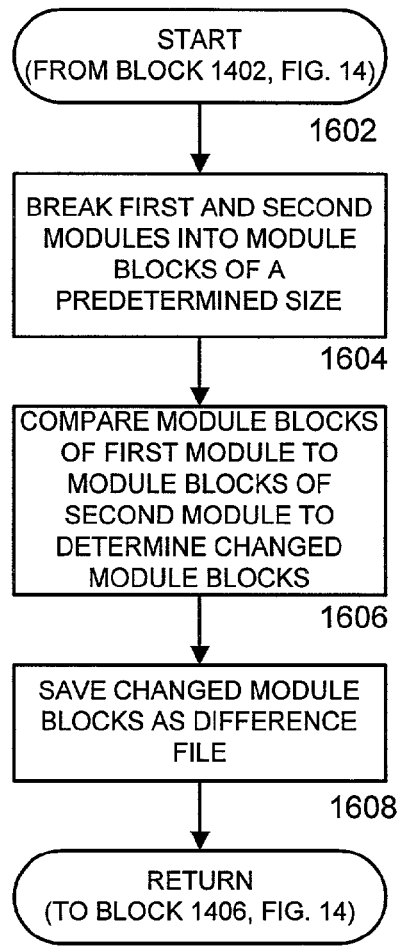
FIG. 16 is a flow diagram showing a second illustrative method for determining a relimiter and creating a delta file.

Referring now to FIG. 16, an alternate Routine 1600 for determining a relimiter and creating a delta file will be described. Routine 1600 begins at block 1604, where the first and second modules are broken into module blocks of a predetermined sized. Rather than utilizing a dynamically determined relimiter as described above with respect to FIG. 15, Routine 1600 uses a relimiter that is of a predetermined size. For instance, the relimiter may be predefined as 512 bits, or 256 bytes. In this manner, each of the modules is broken into module blocks of the same predetermined size.

Block 1604 continues to block 1606, where the module blocks of the first module are compared to the module blocks of the second module to determine which modules blocks have changed. At block 1608, the module blocks that have changed are saved as a delta file. From block 1608, Routine 1600 returns to block 1406, FIG. 14.

Referring now to FIGS. 14, 15, and 17A-17C, an illustrative example of creating a delta file for two modules 106a and 106b will be described. As described above, a relimiter must first be determined for module 106a (block 1404, FIG. 14). To determine the relimiter, the data element occurring most frequently must be determined (block 1506, FIG. 15). By sequentially scanning module 106a, it is determined that the most frequently occurring data element, a bit in this example, is a "1." Therefore, the relimiter is set to "1" (block 1508, FIG. 15). Because a one bit relimiter is not optimal, the most frequently occurring data element neighboring the relimiter is determined (blocks 1510 and 1512, FIG. 15). To accomplish this, the most frequently occurring bits preceding and succeeding each occurrence of a "1" in module 106a are determined. The most frequently occurring bit preceding each "1" in module 106a is a "0." Likewise, the most frequently occurring bit succeeding each "1" in module 106a is also a "0." Therefore, the most frequently occurring 3-bit pattern is "010." The relimiter is accordingly set to "010" (block 1514, FIG. 15).

The above process is again repeated with "010" as the relimiter. This results in the determination that the most frequently occurring 5-bit pattern is "10100." However, because "10100" occurs only once in module 106a, and the pattern "010" occurs six times in module 106a, pattern "010" is the optimal relimiter. Accordingly, "010" is utilized as the relimiter for module 106a.

According to another embodiment of the invention, a predefined relimiter may be used. For instance, the relimiter "101" may be predefined and utilized to break modules into blocks as described above. In even yet another embodiment of the present invention, a predetermined number of data elements may be used to break modules into blocks. For instance, modules may be broken into blocks that are 100 bytes long. Other methods for breaking modules into blocks may be apparent to those skilled in the art.

Once the relimiter has been determined, modules 106a and 106b are broken into module blocks following each occurrence of the relimiter (blocks 1406 and 1408, FIG. 14). This process is illustrated in FIG. 17B, and results in the creation of module blocks 108a and 108b for modules 106a and 106b, respectively. It should be appreciated by the reader that module blocks 108a and 108b may be created physically by creating new files for each of the module blocks, or may be created virtually by creating pointers to each of the module blocks. In an additional embodiment of the present invention, this process may continue by comparing the identified module blocks with each other to identify and remove duplicate module blocks.

Once modules 106*a* and 106*b* have been divided into module blocks 108*a* and 108*b*, the modules blocks are compared sequentially to determine which module blocks have changed (block 1410, FIG. 14). This process is illustrated in FIG. 17C, and results in a list of module blocks that have changed between modules 106*a* and 106*b*. The module blocks that have changed are saved as a delta file (block 1412, FIG. 14). Because the delta file comprises only those module blocks that have changed, the delta file may be combined with a previous version of the module to create a new version of the module. In an additional embodiment of the present invention, this process may continue by comparing the changed module blocks with each other to identify and remove duplicate module blocks.

Figure 18:
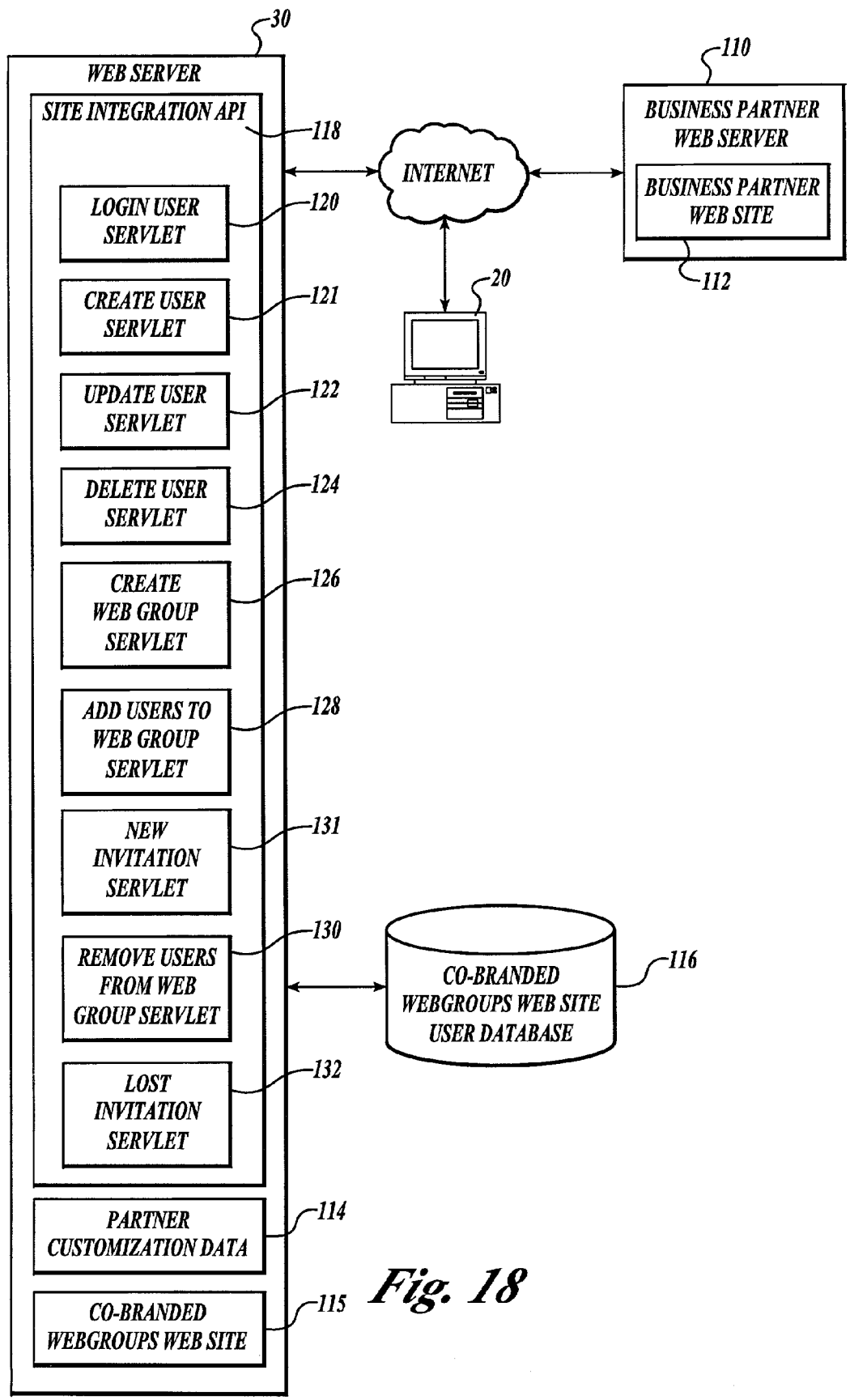
FIG. 18 is a block diagram showing an illustrative operating environment for an actual embodiment of the invention for providing remote access to the facilities of a server computer.

Turning now to FIG. 18, an illustrative embodiment of the invention will be described for providing remote access to the registration and maintenance facilities of the web server 30. According to this embodiment of the invention, a "co-branded" WebGroups WWW site 115 may be provided. For instance, a business partner of the operator of the WebGroups WWW site may desire to have a version of the WebGroups WWW site available for their employees or customers. In order to provide a version of the WebGroups WWW site that is user friendly, the co-branded version of the WebGroups WWW site may be provided in a manner that is visually consistent with a business partner website 112 provided by the business partner. As an example, the co-branded WebGroups WWW site 115 may include a color scheme, header graphics, and site-specific text, that makes the co-branded WebGroups WWW site 115 visually and verbally consistent with the business partner website 112. In order to provide such co-branding, partner customization data 114 may be stored at the web server 30 that identifies the visual attributes and other data that the web server 30 may utilize to present the co-branded WebGroups WWW site 115 in a manner that is visually consistent with the business partner website 112.

In this embodiment of the present invention, a user authorized to utilize the co-branded WebGroups WWW site 115 may log into the web server 30 through a direct connection from the client computer 20. Facilities are provided at the web server 30 to allow a user utilizing the client computer 20 to log into both the business partner website 112 and the co-branded WebGroups WWW site 115 provided by web server 30 through a single login on the partner site. Additionally, facilities are also provided at the web server 30 for allowing remote administration of the co-branded WebGroups WWW site 115 by an operator of the business partner web server 110. These facilities are described in detail below.

The facilities maintained at the web server 30 for providing concurrent login at the business partner web server 110 and the web server 30 and the facilities for maintaining the co-branded WebGroups site 115 are accessed via a site integration application programming interface ("API") 118. In particular, the site integration API 118 includes a login user servlet 120 for processing login requests to the co-branded WebGroups WWW site 115 from the business partner web server 110. The login servlet 120 and the related operation of the business partner web server 110 are described below with respect to FIGS. 19 and 20. The site integration API 118 also maintains facilities for updating information regarding authorized users of the co-branded WebGroups WWW site 115 and for deleting user authorization to access the co-branded Web-Groups WWW site 115. These facilities are contained in the update user servlet 122 and the delete user servlet 124, respectively. These facilities are described below with respect to FIGS. 22 and 23. The web server 30 also provides facilities for authorizing new users to access the co-branded WebGroups WWW site 115. This functionality is contained in a create user servlet 121 which is described below with respect to FIG. 21.

The web server 30 also provides facilities for allowing remote administration of webgroups. For instance, the create webgroup servlet 126 provides a facility for remotely instructing the web server 30 to create a new webgroup. The create webgroup servlet 126 is described below with respect to FIG. 24. Similarly, facilities are provided for adding users to the group of users authorized to access a webgroup and for removing such users. These facilities are provided by the add users to webgroup servlet 128 and the remove users from webgroup servlet 130. These facilities are described below with respect to FIGS. 25 and 26, respectively.

A facility may also be provided by the lost invitation servlet 132 that permits a user to retrieve an invitation number that had been previously issued to the user but lost. This is necessitated by the fact that when a current webgroup user invites another user who does not have an active WebGroup WWW site account to join a webgroup, an invitation number is issued to the new user that references their name and e-mail address in lieu of an automatically generated login and password. In order to create a new WebGroup WWW site account and accept the invitation, the new user must enter this invitation number when he or she first registers. Since the original invitation number is required to register, a mechanism must exist for the user to recover and retrieve that number if the new user loses the invitation. This functionality is provided by the lost invitation servlet 132, which is described below with respect to FIG. 28.

Figure 19:
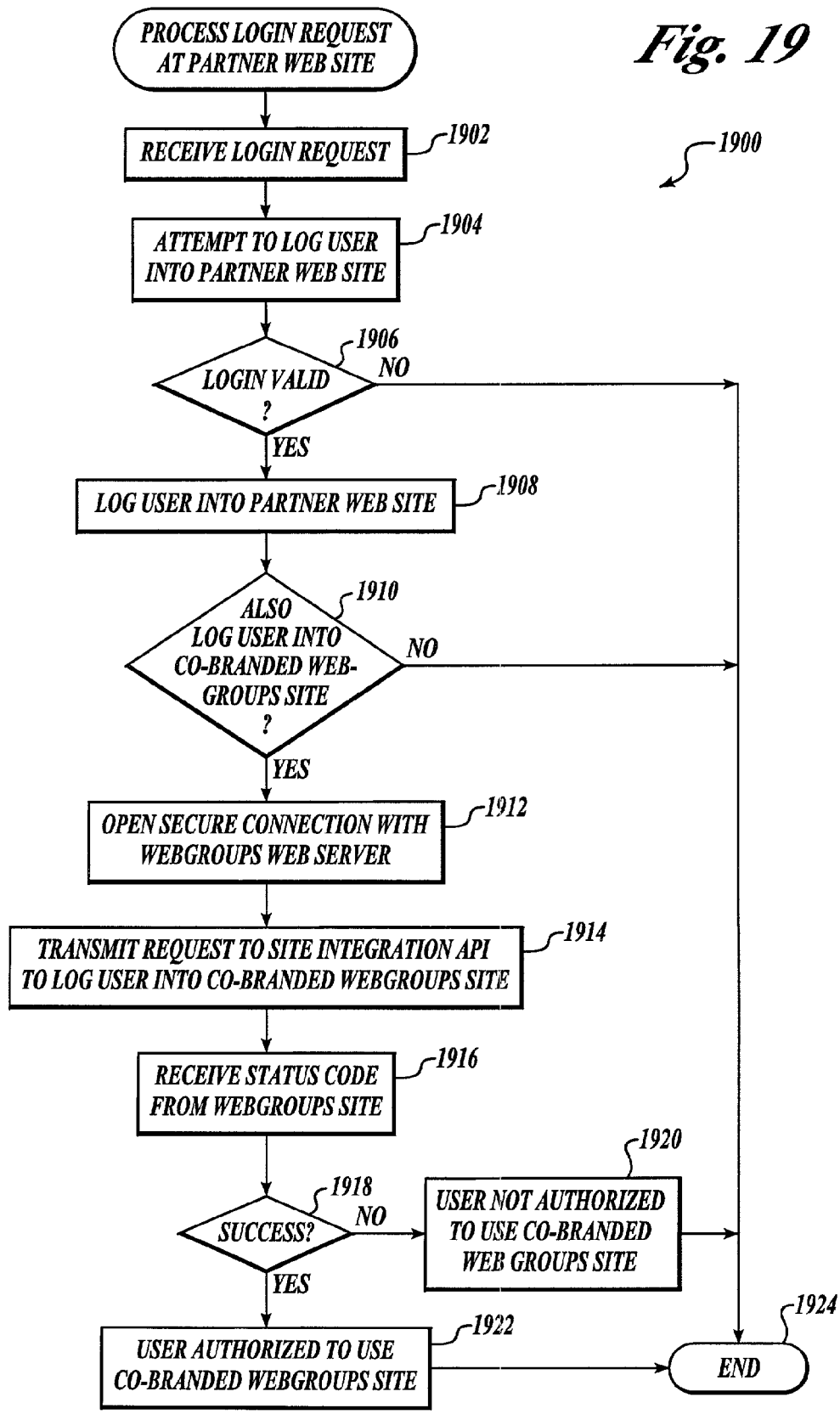
FIG. 19 is a flow diagram showing an illustrative routine for processing a login request at a partner website according to an actual embodiment of the present invention.

Turning now to FIG. 19, an illustrative Routine 1900 will be described for processing a login request at the business partner website 112. The Routine 1900 begins at block 1902, where a login request is received at the business partner website 112. The Routine 1900 then continues to block 1904, where an attempt is made to log the user into the business partner website 112. This would typically include checking the login and password provided by the user against a database of authorized users maintained at the business partner web server 110.

From block 1904, the Routine 1900 continues to block 1906, where a determination is made as to whether the login and password provided by the user are valid. If the login and password are not valid, the Routine 1900 branches to block 1924, where it ends. If the login and password are valid, the Routine 1900 continues from block 1906 to block 1908, where the user is logged into the business partner website. The Routine 1900 then continues from block 1908 to block 1910 where a determination is made as to whether the user should also be logged into the co-branded WebGroups WWW site 115 provided by the web server 30. If the user is not to be logged into the co-branded WebGroups WWW site 115, the Routine 1900 branches from block 1910 to block 1924, where it ends. If the user is to be logged into the co-branded WebGroups WWW site 115, the Routine 1900 continues from block 1910 to block 1912.

At block 1912, a secure communications link, or connection, is opened between the business partner web server 110 and the web server 30. This secure communications link may comprise an HTTPS connection or other type of secure link. Other types of secure communications links may be apparent to those skilled in the art. From block 1912, the Routine 1900 continues to block 1914 where a request is transmitted for the login user servlet 120 located on the web server 30 via the secure communications link. When such a request is received at the web server 30, the web server 30 determines whether the user may be authorized to access the co-branded Web-Groups WWW site 115, and returns an HTTP status code indicating success or failure. The status code is received by the business partner web server 110 via the secure communications link. Accordingly, at block 1918, a determination is made as to whether the user was successfully logged into the web server 30 and the co-branded WebGroups WWW site 115. If a success code was not received at block 1918, the Routine 1900 branches to block 1920 where an indication is provided that the user has not been authorized to utilize the co-branded WebGroups WWW site 115. The Routine 1900 then continues from block 1920 to block 1924, where it ends. If, at block 1918, it is determined that a success code was returned, the Routine 1900 continues to block 1922 where an indication is provided that the user has been authorized to utilize the co-branded WebGroups WWW site 115. The Routine 1900 then continues from block 1920 to block 1924, where it ends.

Figure 20:
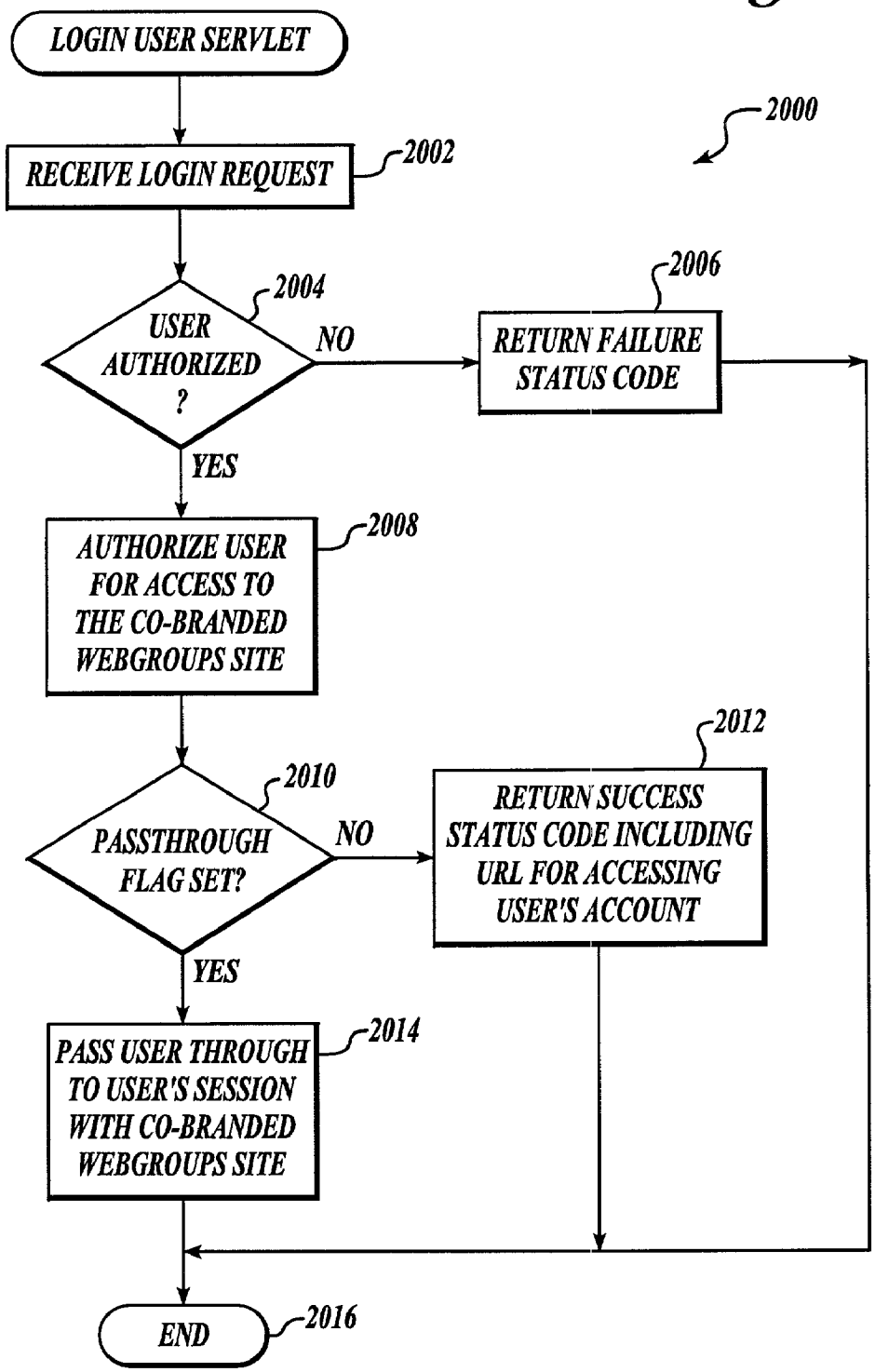
FIG. 20 is a flow diagram illustrating a routine for executing a server facility for logging a user into a server computer according to an actual embodiment of the present invention.

Referring now to FIG. 20, an illustrative Routine 2000 will be described that illustrates the operation of the login user servlet 120 according to an actual embodiment of the present invention. As described above with reference to FIG. 19, the login user servlet 120 is executed in response to a request from the business partner web server 110 to authorize a user for access the co-branded WebGroups WWW site 115. Accordingly, the Routine 2000 begins at block 2002 where a login request is received at the server computer 30 from the business partner website 110 via a secure communications link. The Routine 2000 then continues to block 2004, where determination is made as to whether the user is authorized to access the co-branded WebGroups WWW site 115. This determination may be made by consulting a co-branded WebGroups WWW site user database 116, shown in FIG. 18. If the user is not authorized to access the co-branded WebGroups WWW site 115, the Routine 2000 branches to block 2006, where a failure status code is returned. If the user is authorized to access the co-branded WebGroups WWW site 115, the Routine 2000 continues from block 2004 to block 2008, where the user is authorized to access the co-branded WebGroups WWW site 115. The Routine 2000 then continues from block 2008 to block 2010.

At block 2010, a determination is made as to whether a passthrough flag was included with the login request. A passthrough flag indicates to the web server 30, that the user should be passed directly through to a session with the co-branded WebGroups WWW site 115. If, at block 2010, it is determined that a passthrough flag has not been set, the Routine 2000 branches to block 2012 where a status code is returned to the business partner web server 110 indicating success. The status code may also include a URL for accessing the user's account with the co-branded WebGroups WWW site 115. The Routine 2000 continues from block 2012 to block 2016, where it ends. If, at block 2010, it is determined that the passthrough flag has been set, the Routine 2000 continues from block 2010 to block 2014, where the user is redirected to the user session with the co-branded WebGroups WWW site 115. The Routine 2000 then continues from block 2014 to block 2016, where it ends.

Figure 21:
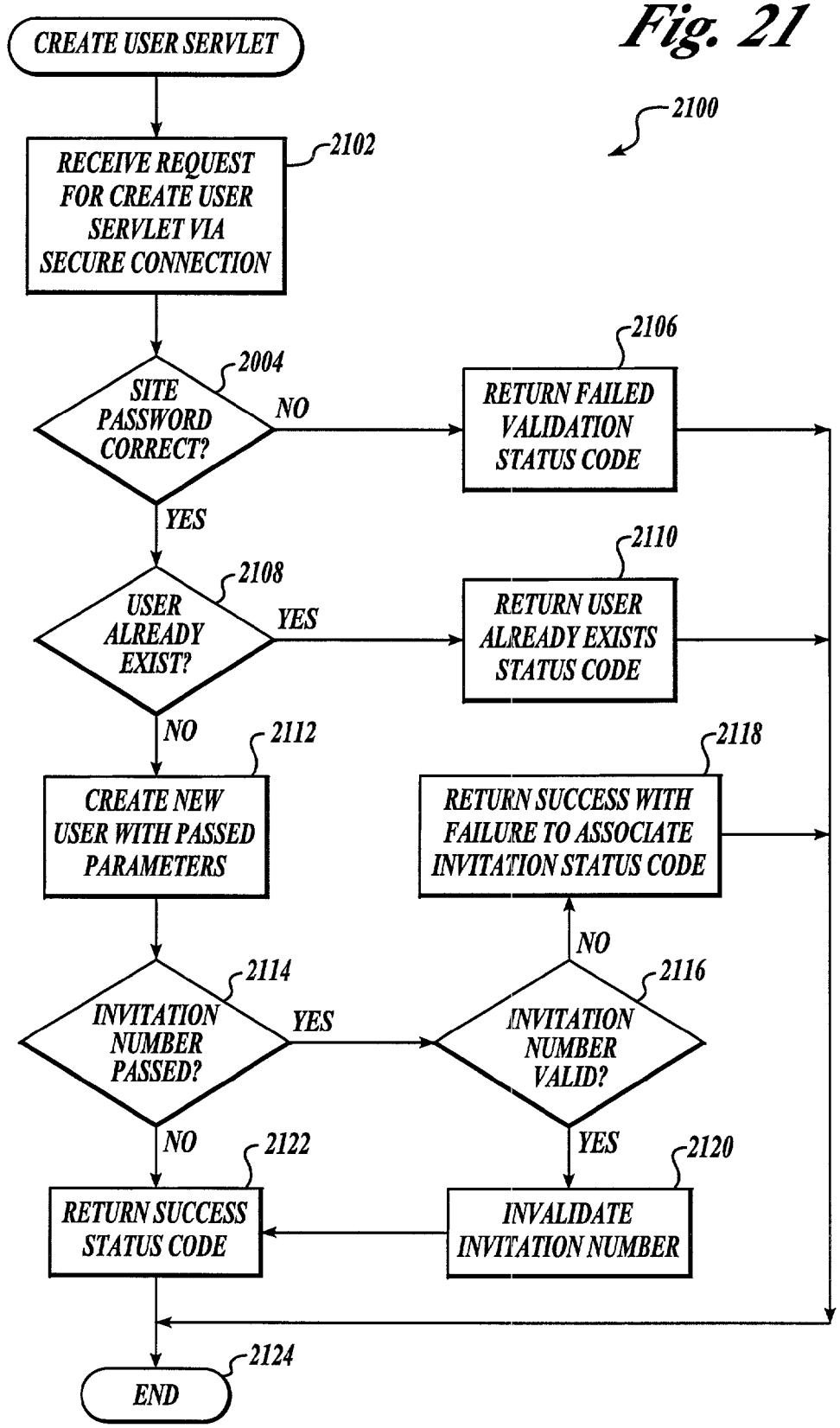
FIG. 21 is a flow diagram illustrating a routine for executing a server facility for creating access rights to the server for a new user according to an actual embodiment of the present invention.

As mentioned briefly above, the site integration API 118 provided at the web server 30 also provides facilities for integrating the registration services of the business partner website 112 with the co-branded WebGroups WWW site 115. Referring now to FIG. 21, an illustrative Routine 2100 will be described which illustrates the operation of the create user servlet 121 for providing a portion of such functionality. The create user servlet 121 provides functionality for registering a new user as an authorized user of the co-branded WebGroups WWW site 115. In particular, the create user servlet 121 authorizes a new user based on a request received from the business partner web server 110. In this manner, a new user may be registered to access the co-branded WebGroups WWW site 115 at the same time a registration is created allowing the user access to the business partner web site 112. This type of synchronization can greatly reduce the administrative overhead incurred when registering users separately at the co-branded WebGroups WWW site 115 and the business partner website 112.

The Routine 2100 begins at block 2102, where a request is received at the web server 30 for the create user servlet 121. This request is received at the web server 30 from the business partner web server 110 via a secure communications link. This request may also be transmitted from the business partner web server 110 in response to the creation of a new user profile at the business partner web server 110. The request may include a site password for the co-branded WebGroups WWW site 115. This password comprises a string value that validates the request and assures that the request is originating from an appropriate source. The request may also include a login ID to identify the new user to be created, a password for the new user to be created, an e-mail address for the new user to be created, and the new user's first and last names.

The request to execute the create user servlet 121 may also optionally contain an invitation number. The invitation number contains an integer that represents an invitation associated with this user. The invitation number will be passed when the new user has been invited to join the co-branded WebGroups WWW site 115 by an existing user. Because a user can receive multiple invitations, more than one invitation number may be passed with the request. All invitation numbers are automatically associated with the same user. Additionally, once an invitation number has been associated with a user, it is no longer valid when received in conjunction with a request.

The Routine 2100 continues from block 2102 to block 2104 where a determination is made as to whether the site password included as part of the request is correct. If the site password is incorrect, the Routine 2100 branches to block 2106 where a failed validation status code is returned to the business partner web server 110. If, at block 2104, it is determined that the site password is correct, the Routine 2100 continues to block 2108. At block 2108, a determination is made as to whether the user to be created currently exists in the co-branded WebGroups WWW site user database 116. If the user already exists in the user database, the Routine 2100 branches to block 2110, where a status code indicating that the user already exists is returned to the business partner web server 110. If the user does not already exist, the Routine 2100 continues from block 2108 to block 2112.

At block 2112, a new user entry is created in the co-branded WebGroups WWW site user database 116. This entry will include parameters passed as a part of the request, including the new user's name, login ID, password, and e-mail address. The Routine 2100 then continues from block 2112 to block 2114 where a determination is made as to whether an invitation number was also passed with the request. If an invitation number was passed with the request, the Routine 2100 branches to block 2116, where a determination is made as to whether the invitation number is valid. If the invitation number is not valid, the Routine 2100 branches to block 2118 where a success code is returned indicating a failure to associate the invitation number with a valid invitation number. If, at block 2116, it is determined that the invitation number is valid, the Routine 2100 continues to block 2120 where the invitation number is invalidated so that it may not be utilized with a future request.

If, at block 2114, it is determined that an invitation number was not passed with the request, the Routine 2100 continues to block 2122 where a status code is returned to the business partner web server 110 indicating that the new user was successfully created. From blocks 2106, 2110, 2118, and 2122, the Routine 2100 continues to block 2124, where it ends.

As described briefly above, the site integration API 118 also provides functionality for updating a user entry in the co-branded WebGroups WWW site user database 116. This functionality is typically provided in response to a request from the business partner web server 110 over a secure communications link, and may be utilized by the business partner web server 110 to coordinate changes to a user database located at the business partner web server 110 with the co-branded WebGroups WWW site user database 116.

Figure 22:
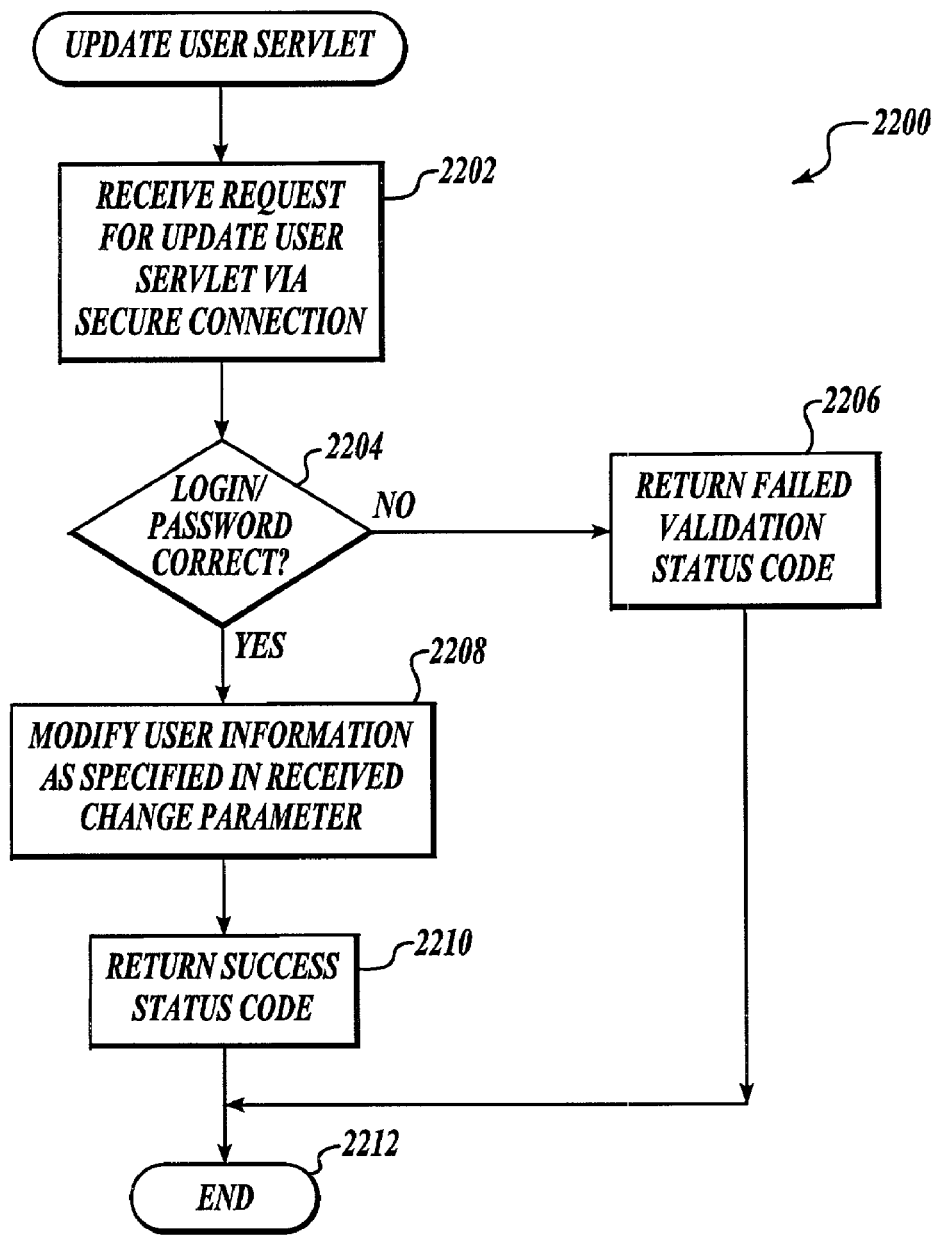
FIG. 22 is a flow diagram illustrating a routine for executing a server facility for updating user information according to an actual embodiment of the present invention.

Referring now to FIG. 22, an illustrative Routine 2200 showing the operation of the update user servlet 122 for providing functionality for updating a user database will be described. The Routine 2200 begins at block 2202, where a request is received to update user information stored in the co-branded WebGroups WWW site user database 116 via a secure communications link. The request may include the login and password for the user whose information is to be changed. The request may also include a key identifying the parameter to be changed and the new value for the parameter. For example, if a user's password was to be changed, the parameter would include text identifying the password parameter and a new value for the password.

The Routine 2200 continues from block 2202 to block 2204, where a determination is made as to whether the login and password supplied as part of the request are correct. If the login and password are incorrect, the Routine 2200 branches to block 2206 where a status code indicating a failed validation is returned to the business partner web server 110. If, at block 2204, it is determined that the login and password are correct, the Routine 2200 continues to block 2208. At block 2208, the user information contained in the co-branded WebGroups WWW site user database 116 is modified as requested in the received change parameter, or parameters. The Routine 2200 then continues to block 2210, where a success status code is returned to the business partner web server 110. The Routine 2200 then continues to block 2212, where it ends.

Figure 23:
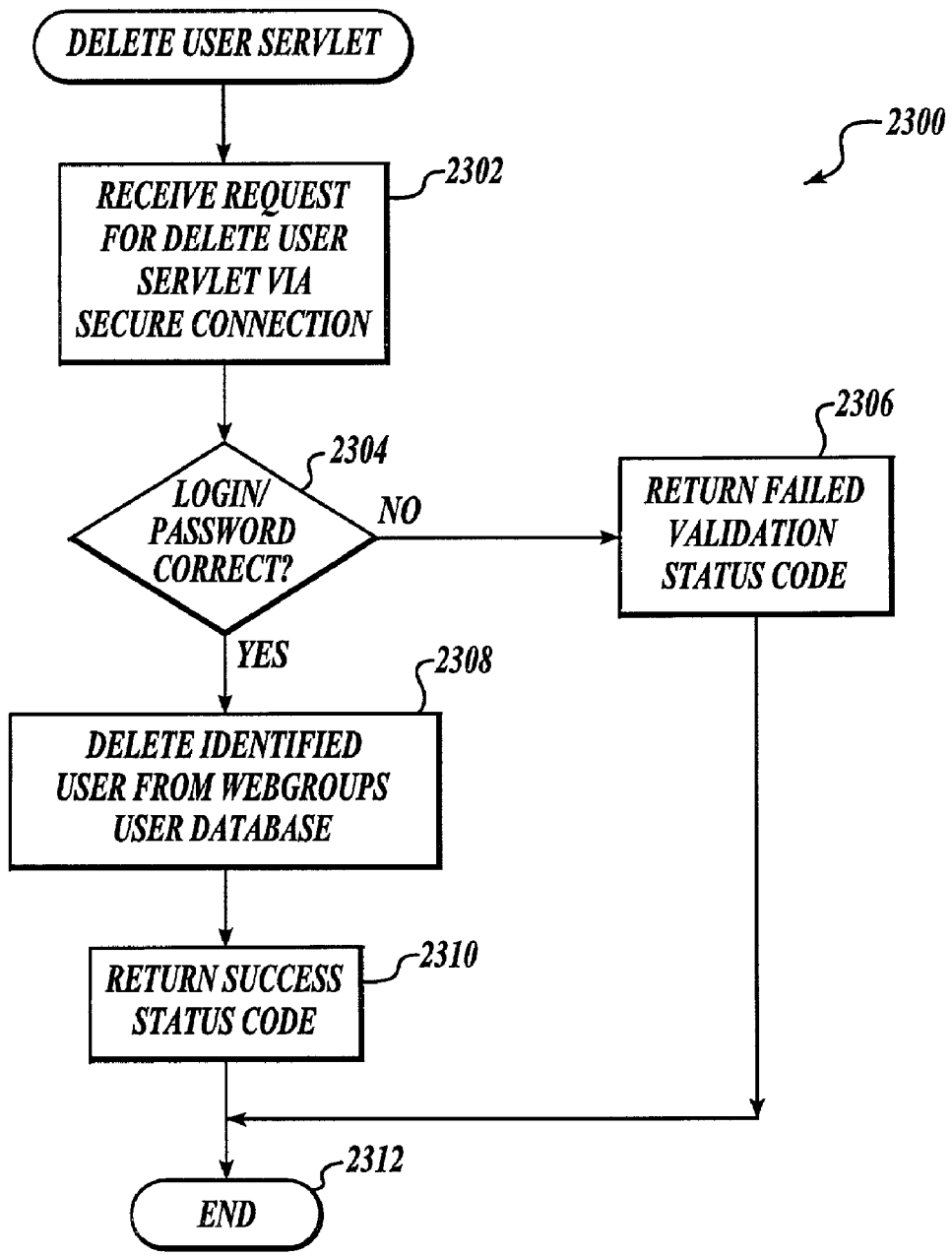
FIG. 23 is a flow diagram illustrating a routine for executing a server facility for deleting user access rights and information according to an actual embodiment of the present invention.

Turning now to FIG. 23, an illustrative Routine 2300 will be described which illustrates the operation of the delete user servlet 124. A user may be deleted from the co-branded WebGroups WWW site user database 116 in a manner similar to that described above with reference to FIG. 21 for creating a new user. The Routine 2300 begins at block 2302 where a request is received at the web server 30 from the business partner web server 110 via a secure communications link. The request identifies the delete user servlet 124 along with the login and password for the user to be deleted. The Routine 2300 then continues from block 2302 to block 2304, where a determination is made as to whether the received login and password are correct. If the received login and password are incorrect, the Routine 2300 branches to block 2306 where a failed validation status code is returned to the business partner web server 110. If, at block 2304, it is determined that the login and password are correct, the Routine 2300 continues to block 2308.

At block 2308, the user information associated with the received login and password is deleted from the co-branded WebGroups WWW site user database 116. The Routine 2300 then continues to block 2310, where a success status code is returned from the web server 30 to the business partner web server 110 via the secure communications link. The Routine 2300 then continues from block 2310 to block 2312, where it ends.

Figure 24:
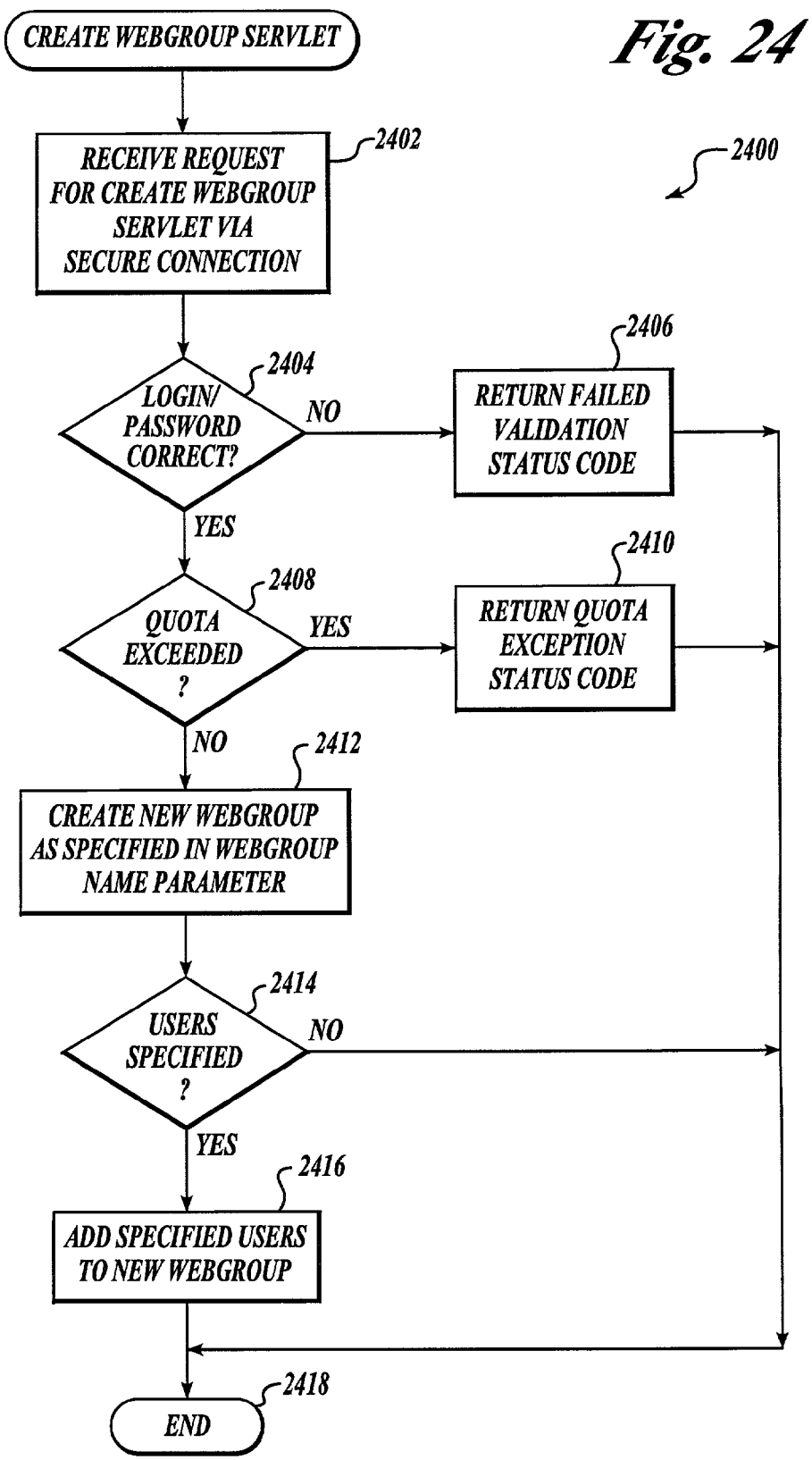
FIG. 24 is a flow diagram illustrating a routine for executing a server facility for creating a new webgroup according to an actual embodiment of the present invention.

Turning now to FIG. 24, an illustrative Routine 2400 will be described that illustrates the operation of the create webgroup servlet 126. The create webgroup servlet 126 creates a new webgroup at the co-branded WebGroups WWW site 115 in response to a request received from the business partner web server 110 via a secure communications link. In this manner, the operator of the business partner web server 110 can create new webgroups and assign members to these new groups without the requirement that they utilize the user interface front end provided at the co-branded WebGroups WWW site 115.

The Routine 2400 begins at block 2402, where a request is received for the create webgroup servlet 126 via a secure communications link. As mentioned above, this request is typically received from the business partner web server 110. The request includes a login and password for the user desiring to create a new webgroup. The request also includes a string value that represents the webgroup name, and an optional series of string values that identify users who should be authorized to access the new webgroup.

The Routine 2400 continues from block 2402 to block 2404, where a determination is made as to whether the login and password supplied as a part of the request are correct. If the login and password are incorrect, the Routine 2400 branches to block 2406, where a failed validation status code is returned to the business partner web server 110. If, at block 2404, it is determined that the login and password are correct, the Routine 2400 continues to block 2408.

At block 2408, a determination is made as to whether the user identified by the login received as a part of the request has exceeded their quota for creating new webgroups. If the user has exceeded their quota, the Routine 2400 branches to block 2410, where a quota exception status code is returned to the business partner web server 110. If, at block 2408, it is determined that the user has not exceeded their webgroup quota, a new webgroup is created as specified in the webgroup name parameter received with the request. The Routine 2400 then continues from block 2412 to block 2414.

At block 2414, a determination is made as to whether users were identified as part of the request to create the new webgroup. If users were not identified, the Routine 2400 branches to block 2418, where it ends. If, at block 2414, it is determined that users were specified as a part of the request, the Routine 2400 continues to block 2416. At block 2416, the users specified as part of the request are added to the new webgroup and provided with permission, or authorization rights, to access the new webgroup. The Routine 2400 then continues from block 2416 to block 2418, where it ends.

Figure 25:
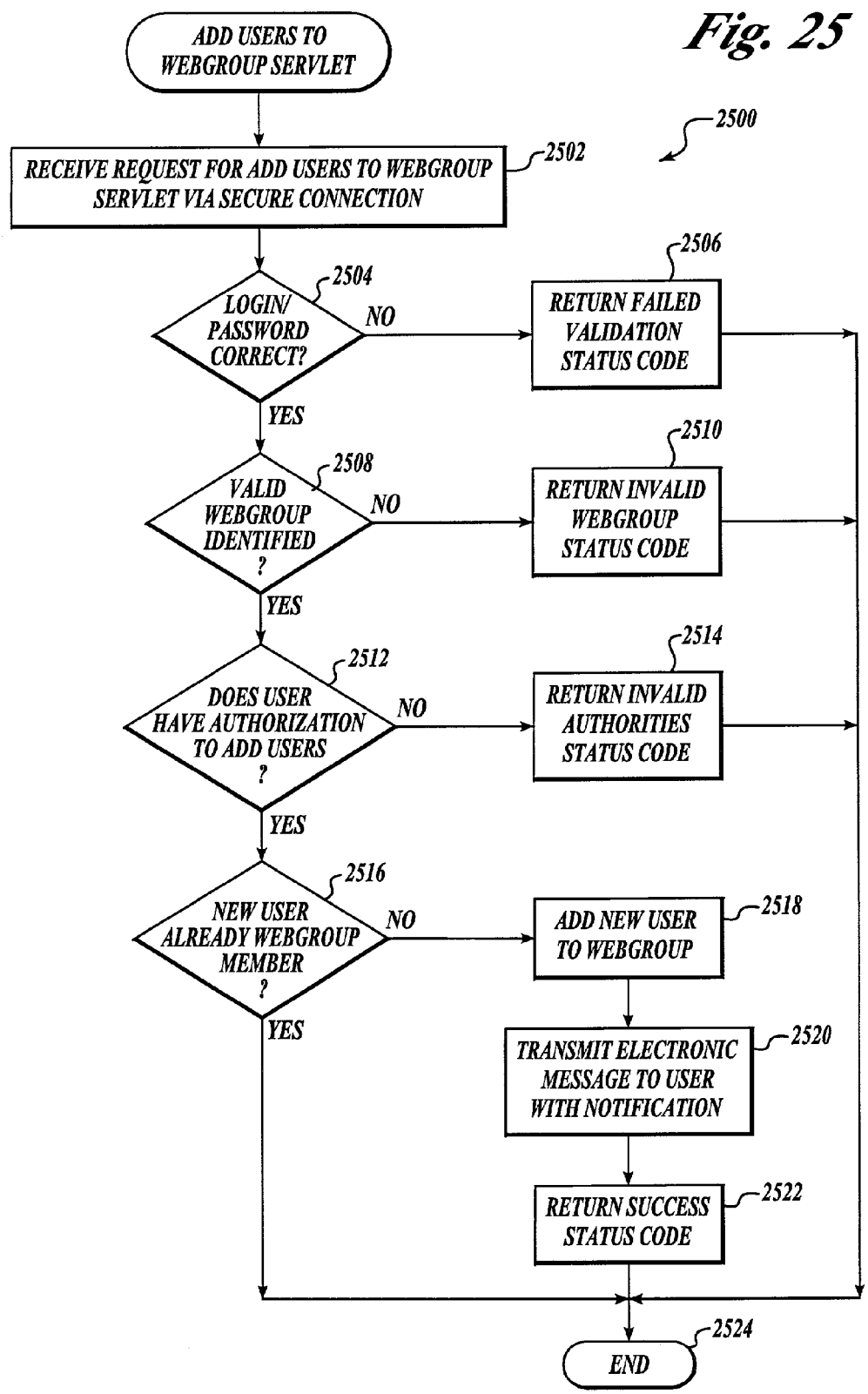
FIG. 25 is a flow diagram illustrating a routine for executing a server facility for authorizing new users to access a webgroup according to an actual embodiment of the present invention.

Turning now to FIG. 25, an illustrative Routine 2500 will be described that shows the operation of the add users to webgroup servlet 128. The add users to webgroup servlet 128 allows users to be added to the group of users authorized to utilize an existing webgroup. It is typically received in response to a request from the business partner web server 110 via a secure communications link. In this manner, the operator of the business partner web server 110 can add users to existing webgroups without the requirement that they utilize the user interface provided by the co-branded WebGroups WWW site 115.

The Routine 2500 begins at block 2502, where a request is received for the add users to webgroup servlet 128 via a secure communications link. The request includes a login and password for the user desiring to add new users to a webgroup, the identity of the webgroup to which users should be added, and the e-mail addresses for one or more new users to be added to the webgroup.

The Routine 2500 continues from block 2502 to block 2504, where a determination is made as to whether the login and password supplied as a part of the request are correct. If the login and password are incorrect, the Routine 2500 branches to block 2506, where a failed validation status code is returned to the business partner web server 110. If, at block 2504, it is determined that the login and password are correct, the Routine 2500 continues to block 2508.

At block 2508, a determination is made as to whether a valid webgroup was identified as a part of the request. If a valid webgroup was not identified as part of the request, the Routine 2500 branches to block 2510 where an invalid webgroup status code is returned to the business partner web server 110. If, at block 2508, it is determined that a valid group was identified as a part of the request, the Routine 2500 continues from block 2508 to block 2512.

At block 2512, a determination is made as to whether the user identified as a part of the request has the appropriate authorization to add users to the specified webgroup. If the user does not have the correct authorization, the Routine 2500 branches to block 2514, where an invalid authorities status code is returned to the business partner web server 110. If, at block 2512, it is determined that the user has the appropriate authority to add users to the webgroup, the Routine 2500 continues from block 2512 to block 2516.

At block 2516, a determination is made as to whether the new user to be added to the webgroup is currently a member of the webgroup. If the user to be added is currently a member of the webgroup, the Routine 2500 continues to block 2524, where it ends. If the user to be added is not currently a member of the webgroup, the Routine 2500 branches to block 2518, where the new user is added to the webgroup and provided with the appropriate authority to utilize the webgroup.

The Routine 2500 then continues to block 2520, where an electronic message is transmitted to the new user with notification that the user has been added to the new webgroup. The electronic message may comprise an e-mail message, an instant pager message, or other type of electronic message known to those skilled in the art. From block 2520, the Routine 2500 continues to block 2522 where a success status code is returned to the business partner web server 110. The Routine 2500 then continues to block 2524, where it ends.

Figure 26:
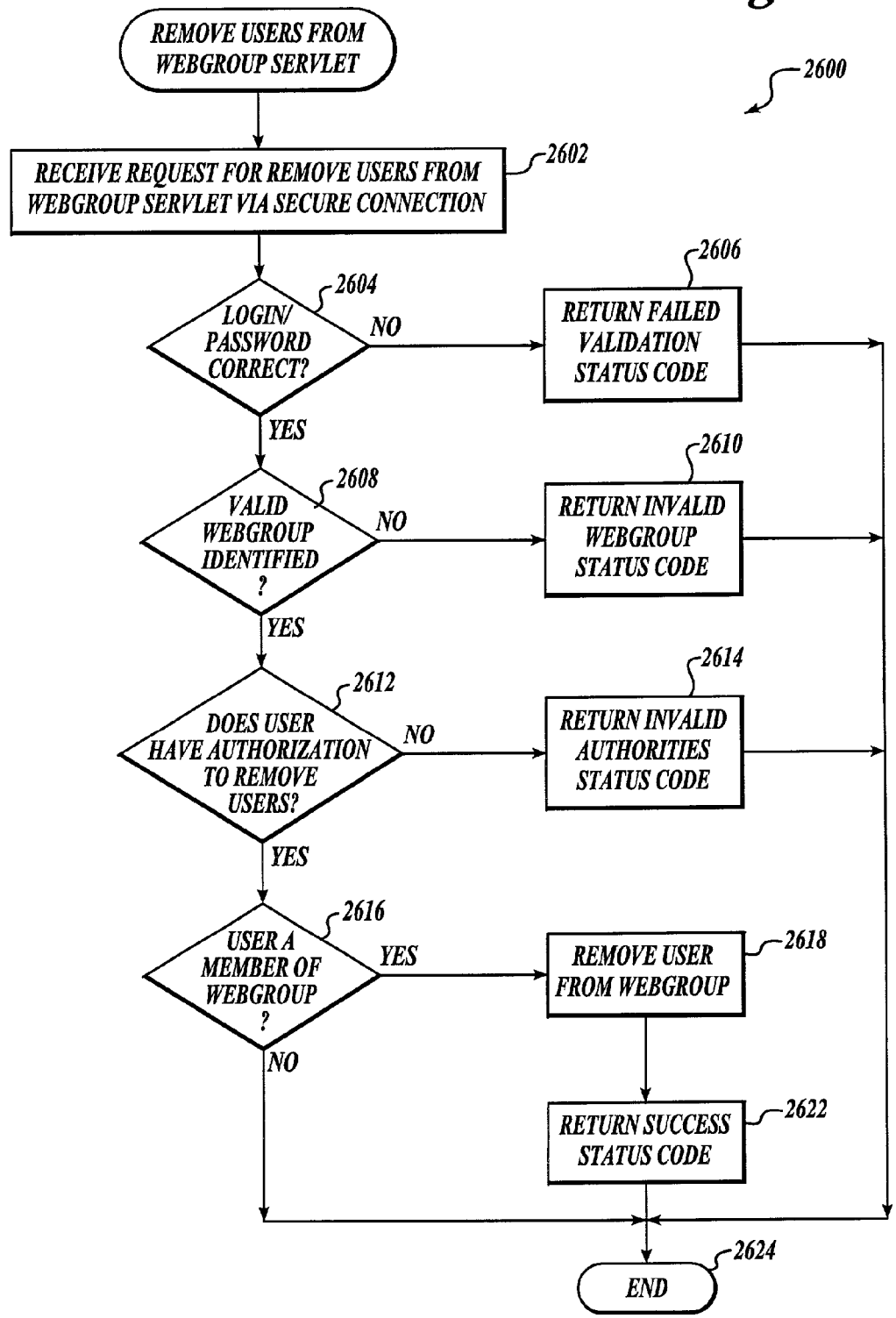
FIG. 26 is a flow diagram illustrating a routine for executing a server facility for removing user authorization for accessing a webgroup according to an actual embodiment of the present invention.

Turning now to FIG. 26, an illustrative Routine 2600 will be described that shows the operation of the remove users from webgroup servlet 130. The remove users from webgroup servlet 130 allows users to be removed from the group of users authorized to utilize an existing webgroup. It is typically received in response to a request from the business partner web server 110 via a secure communications link. In this manner, the operator of the business partner web server 110 can remove users from existing webgroups without the requirement that they utilize the user interface provided by the co-branded WebGroups WWW site 115.

The Routine 2600 begins at block 2602, where a request is received for the remove users from webgroup servlet 130 via a secure communications link. The request includes a login and password for the user to remove users from a webgroup, the identity of the webgroup from which the user should be removed, and the e-mail addresses for one or more users to be removed from the webgroup.

The Routine 2600 continues from block 2602 to block 2604, where a determination is made as to whether the login and password supplied as a part of the request are correct. If the login and password are incorrect, the Routine 2600 branches to block 2606, where a failed validation status code is returned to the business partner web server 110. If, at block 2604, it is determined that the login and password are correct, the Routine 2600 continues to block 2608.

At block 2608, a determination is made as to whether a valid webgroup was identified as a part of the request. If a valid webgroup was not identified as part of the request, the Routine 2600 branches to block 2610 where an invalid webgroup status code is returned to the business partner web server 110. If, at block 2608, it is determined that a valid group was identified as a part of the request, the Routine 2600 continues from block 2608 to block 2612.

At block 2612, a determination is made as to whether the user identified as a part of the request has the appropriate authorization to remove users from the specified webgroup. If the user does not have the correct authorization, the Routine 2600 branches to block 2614, where an invalid authority status code is returned to the business partner web server 110. If, at block 2612, it is determined that the user has the appropriate authority to remove users from the webgroup, the Routine 2600 continues from block 2612 to block 2616.

At block 2616, a determination is made as to whether the user to be removed from the webgroup is currently a member of the webgroup. If the user to be removed is not currently a member of the webgroup, the Routine 2600 continues to block 2624, where it ends. If the user to be removed is a current member of the webgroup, the Routine 2600 branches to block 2618, where the user is removed from the webgroup. The Routine 2600 then continues to block 2622, where a success status code is returned to the business partner web server 110. The Routine 2600 then continues to block 2624, where it ends.

Figure 27:
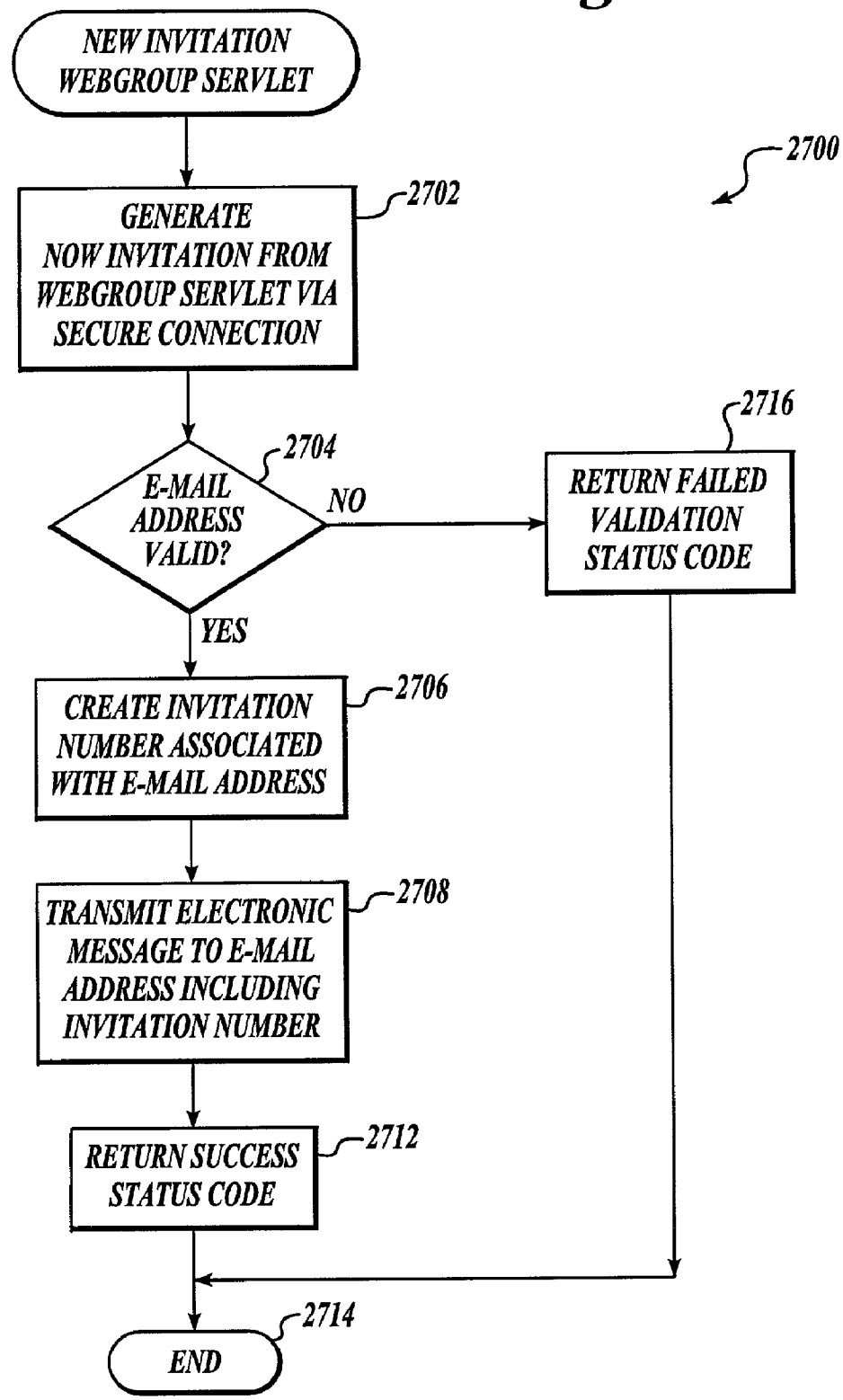
FIG. 27 is a flow diagram illustrating a routine for executing a server facility for issuing a new invitation to join a webgroup according to an actual embodiment of the present invention.

Referring now to FIG. 27, an illustrative Routine 2700 will be described that illustrates the operation of the new invitation servlet 131. When a current webgroup user invites another user who does not have an active WebGroup WWW site account to join a webgroup, an invitation number is issued to the new user that references their name and e-mail address in lieu of an automatically generated login and password. In order to create a new account and accept the invitation, the new user must enter this invitation number when he or she first registers. Since the original invitation number is required to register, a mechanism must exist for the user to recover and retrieve that number if the new user loses the invitation. This functionality is provided by the new invitation servlet 131.

The Routine 2700 begins at block 2702, where a request is received for the new invitation webgroup servlet 131 via a secure connection from the business partner web server 110. The request includes the e-mail address for which a new invitation number should be issued. The Routine 2700 continues from block 2702 to block 2704, where a determination is made as to whether the e-mail address received as part of the request is valid. If the e-mail address is invalid, the Routine 2700 branches to block 2716 where a failed validation status code is returned to the business partner web server 110.

If, at block 2704, it is determined that the received e-mail address is valid, the Routine 2700 continues to block 2706. At block 2706, an invitation number associated with the received e-mail address is generated. The Routine 2700 then continues to block 2708, where an electronic message is transmitted to the received e-mail address including the retrieved invitation number. The Routine 2700 then continues to block 2712 where a success status code is returned to the business partner web server 110. The Routine 2700 then continues to block 2714, where it ends.

Figure 28:
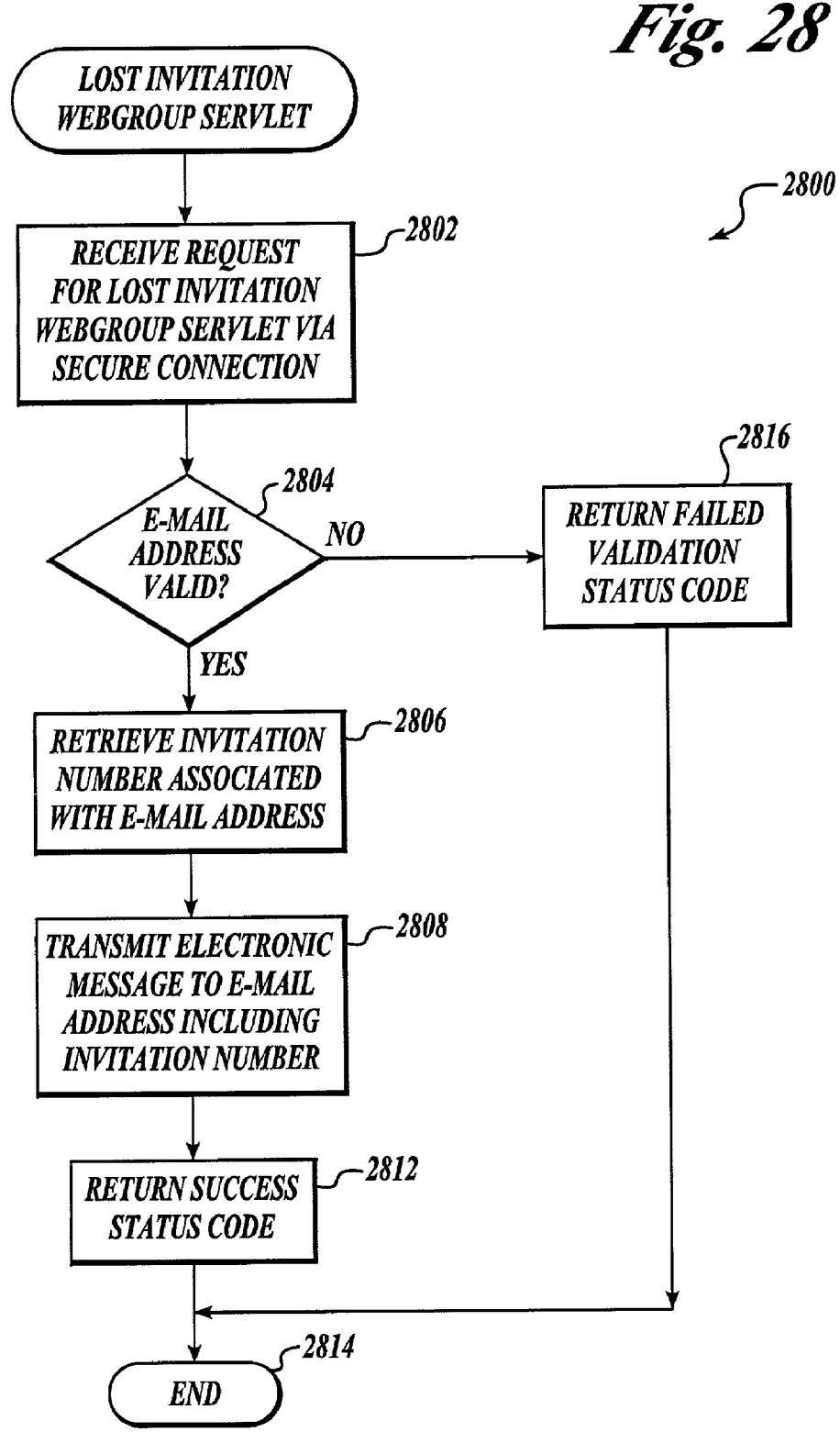
FIG. 28 is a flow diagram illustrating a routine for executing a server facility for reissuing an invitation to join a webgroup according to an actual embodiment of the present invention.

Referring now to FIG. 28, an illustrative Routine 2800 will be described that illustrates the operation of the lost invitation servlet 132. As described briefly above, when a current webgroup user invites another user who does not have an active WebGroup WWW site account to join a webgroup, an invitation number is issued to the new user that references their name and e-mail address in lieu of an automatically generated login and password. In order to create a new account and accept the invitation, the new user must enter this invitation number when he or she first registers. Since the original invitation number is required to register, a mechanism must exist for the user to recover and retrieve that number if the new user loses the invitation. This functionality is provided by the lost invitation servlet 132.

The Routine 2800 begins at block 2802, where a request is received for the lost invitation webgroup servlet 132 via a secure connection from the business partner web server 110. The request includes the e-mail address for which a lost invitation number should be reissued. The Routine 2800 continues from block 2802 to block 2804, where a determination is made as to whether the e-mail address received as part of the request is valid. If the e-mail address is invalid, the Routine 2800 branches to block 2816 where a failed validation status code is returned to the business partner web server 110.

If, at block 2804, it is determined that the received e-mail address is valid, the Routine 2800 continues to block 2806. At block 2806, the invitation number associated with the received e-mail address is retrieved. The Routine 2800 then continues to block 2808, where an electronic message is transmitted to the received e-mail address including the retrieved invitation number. The Routine 2800 then continues to block 2812 where a success status code is returned to the business partner web server 110. The Routine 2800 then continues to block 2814, where it ends.

It should be appreciated that the present invention provides a method and system providing remote access to the facilities of a server computer. While an illustrative embodiment of the invention has been illustrated and described, it will be appreciated that various changes can be made therein without departing from the spirit and scope of the invention.

The embodiments of the invention in which an exclusive property or privilege is claimed are defined as follows:

1. A method for providing remote access to the facilities of a server computer, comprising:
   receiving a user request to access a first server computer;
   determining whether said user request may be granted;
   in response to determining that said user request may be granted, determining whether access to a second server computer should also be granted; and
   in response to determining that access to said second server computer should be granted, transmitting a request to access to said second server computer from said first server computer to said second server computer via a secure communications connection, said second server computer is operative to provide facilities for storing and updating a network database in a manner that is visually consistent with a Web site on said first server computer.

2. The method of claim 1, wherein said second server computer comprises a server computer operative to store and update said network database.

3. The method of claim 1, wherein said first server computer comprises a server computer operative to provide said Web site.

4. The method of claim 1, further comprising receiving an indication that access to said second server computer should also be granted, redirecting said user from said first computer to said second computer.

5. A method for providing remote access to the facilities of a server computer, comprising:
   receiving a request at a server computer operative to store and update a network database to add a new user to a group of users authorized to utilize said network database;
   determining whether said request may be granted; and
   in response to determining that said request may be granted, adding said new user to said group of users authorized to utilize said network database, said group of users defining a collaborative group spanning across said server computer and another server computer so as to allow users to share data.

6. The method of claim 5, wherein said request is received over a secure communications link from a second server computer.

7. The method of claim 6, wherein a login and password for said new user are provided as a part of said request.

8. The method of claim 7, further comprising:
   determining whether said new user has previously been added to said group of users authorized to utilize said network database; and
   in response to determining that said new user has previously been added to said group of authorized users, denying said request to add said new user.

9. The method of claim 5, wherein said server computer comprises a server computer operative to store and update a network database, and wherein said second server computer comprises a server computer operative to provide an Internet Web site.

10. A method for providing remote access to the facilities of a server computer, comprising:
    receiving a request at a server computer operative to store and update a network database to update user data for a user authorized to utilize said network database, said user being removable from said server computer when a corresponding user is removed from another server computer that issues the request;
    determining whether said request may be granted; and
    in response to determining that said request may be granted, updating said user data as specified in said request.

11. The method of claim 10, wherein said request is received over a secure communications link from a second server computer.

12. The method of claim 11, wherein said server computer comprises a server computer operative to store and update a network database and wherein said second server computer comprises a server computer operative to provide an Internet Web site.

13. A method for providing remote access to the facilities of a server computer, comprising:
    receiving a request for a facility available at a server computer operative to store and update a network database via a secure communications link;
    determining whether said request may be granted; and
    in response to determining that said request may be granted, executing said facility at said server computer according to said request, said facility including creation of a new collaborative group in which users may share data, the method refraining from creating said collaborative group if a quota has been exceeded.

14. The method of claim 13, wherein said facility comprises an application programming interface for deleting access rights for a user to said server computer.

15. The method of claim 14, wherein said request further comprises a user ID for said user to be deleted.

16. The method of claim 13, wherein said request further comprises the identity of one or more users to be added to said new collaborative group.

17. The method of claim 13, wherein said facility comprises an application programming interface for adding new users to an existing collaborative group in which users may share data.

18. The method of claim 13, wherein said facility comprises an application programming interface for removing users from an existing collaborative group in which users may share data.

19. A computer-readable medium comprising instructions which, when executed by a computer, cause the computer to perform any one of the methods of claims 1-3, 4-15, and 16-18.

20. A computer-controlled apparatus capable of performing any one of the methods of claims 1-3, 4-15, and 16-18.

* * * * *